US008923094B2

(12) United States Patent
Jing et al.

(10) Patent No.: US 8,923,094 B2
(45) Date of Patent: Dec. 30, 2014

(54) HYDROCARBON DETECTION WITH PASSIVE SEISMIC DATA

(75) Inventors: Charlie Jing, Houston, TX (US); Jim J. Carazzone, Houston, TX (US); Eva-Maria Rumpfhuber, Houston, TX (US); Rebecca L. Saltzer, Houston, TX (US); Thomas A. Dickens, Houston, TX (US); Anoop A. Mullur, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 834 days.

(21) Appl. No.: 13/140,749

(22) PCT Filed: Dec. 14, 2009

(86) PCT No.: PCT/US2009/067913
§ 371 (c)(1),
(2), (4) Date: Jun. 17, 2011

(87) PCT Pub. No.: WO2010/080366
PCT Pub. Date: Jul. 15, 2010

(65) Prior Publication Data
US 2011/0255371 A1 Oct. 20, 2011

Related U.S. Application Data

(60) Provisional application No. 61/143,695, filed on Jan. 9, 2009, provisional application No. 61/267,695, filed on Dec. 8, 2009.

(51) Int. Cl.
G01V 1/28 (2006.01)
G01V 11/00 (2006.01)

(52) U.S. Cl.
CPC *G01V 1/28* (2013.01); *G01V 1/288* (2013.01); *G01V 11/00* (2013.01); *G01V 2210/123* (2013.01)
USPC .................................. 367/73; 367/37; 703/2

(58) Field of Classification Search
CPC .............................. G01V 1/282; G01V 1/288
USPC ....................................................... 367/73, 37
See application file for complete search history.

(56) References Cited

U.S. PATENT DOCUMENTS 5,200,928 A 4/1993 MaCleod
6,128,580 A 10/2000 Thomsen
(Continued)

FOREIGN PATENT DOCUMENTS

WO WO 00/23821 7/2000
WO WO 2005/017563 2/2005
(Continued)

OTHER PUBLICATIONS

Seeber et al, Journal of geophysical research, vol. 100, No. B5, pp. 8285-8310, May 10, 1995.*

(Continued)

*Primary Examiner* — Luke Ratcliffe
*Assistant Examiner* — Hovhannes Baghdasaryan

(57) ABSTRACT

Method for using seismic data from earthquakes to address the low frequency lacuna problem in traditional hydrocarbon exploration methods. Seismometers with frequency response down to about 1 Hz are placed over a target subsurface region in an array with spacing suitable for hydrocarbon exploration (21). Data are collected over a long (weeks or months) time period (22). Segments of the data (44) are identified with known events from earthquake catalogs (43). Those data segments are analyzed using techniques such as traveltime delay measurements (307) or receiver function calculations (46) and then are combined with one or more other types of geophysical data acquired from the target region, using joint inversion (308-310) in some embodiments of the method, to infer physical features of the subsurface indicative of hydrocarbon potential or lack thereof (26).

24 Claims, 15 Drawing Sheets

(56) References Cited

U.S. PATENT DOCUMENTS

| | | | |
|---|---|---|---|
| 6,473,696 | B1 | 10/2002 | Onyia et al. |
| 6,739,165 | B1 | 5/2004 | Strack |
| 7,164,619 | B2 | 1/2007 | Robertsson et al. |
| 7,219,115 | B2 | 5/2007 | Selvaraj |
| 7,328,107 | B2 | 2/2008 | Strack et al. |
| 7,340,348 | B2 | 3/2008 | Strack et al. |
| 7,424,367 | B2 | 9/2008 | Saltzer et al. |
| 7,486,589 | B2 | 2/2009 | Lee et al. |
| 7,590,491 | B2 | 9/2009 | Saenger |
| 7,620,534 | B2 | 11/2009 | Pita et al. |
| 7,676,326 | B2 | 3/2010 | Podladchikov et al. |
| 7,724,608 | B2 | 5/2010 | Simon |
| 2008/0075920 | A1 | 3/2008 | Chih et al. |

FOREIGN PATENT DOCUMENTS

| | | |
|---|---|---|
| WO | WO 2005/085909 | 9/2005 |
| WO | WO 2008/042081 | 4/2008 |
| WO | WO 2008/087505 | 7/2008 |

OTHER PUBLICATIONS

Stewart, "Principles and applications of Microearthquake Networks", vol. 2, 1981, ISBN 0-12-01886207.*
Ammon, C.J. (1991), "The Isolation of Receiver Effects from Teleseismic P Waveforms," *Bulletin of the Seismological Society of America* 81(6), pp. 2504-2510.
Archie, G.E. (1942), "The Electrical Resistivity Log as an Acid in Determining Some Reservoir Characteristics," *Transactions of the AIME* 146, pp. 54-62.
Artman, B. (2006), "Imaging passive seismic data," *Geophysics* 71(4), pp. S1177-S1187.
Audet, C. et al. (2006), "Mesh Adaptive Direct Search Algorithms for Constrained Optimization," *SIAM J. Optim.* 177, pp. 188-217.
Bertrand, E. et al. (2002), "Crustal structure deduced from receiver functions via single-scattering migration," *Geophys. J. Int.* 150, pp. 524-541.
Buske, S. et al. (2007), "Active and Passive Seismic Imaging of the San-Andreas-Fault-System," *European Geosciences Union Abstract*, 1 page.
Buske, S. et al. (2002), "Broad depth range seismic imaging of the subducted Nazca Slab, North Chile," *Tectonophysics* 350, pp. 273-282.
Claerbout, J.F. (1968), "Synthesis of a Layered Medium from its Acoustic Transmission Response," *Geophysics* 33(2), pp. 264-269.
Carazzone, J.J. et al. (2005), "Three Dimensional Imaging of Marine CSEM Data," SEG/Houston 2005 Annual Meeting, pp. 575-579.
Carcione, J.M. et al. (2007), "Cross-property relations between electrical conductivity and the seismic velocity of rocks," *Geophysics* 72(5), pp. E193-E204.
Chen, J. et al. (2007), "Effects of uncertainty in rock-physics models on reservoir parameter estimation using marine seismic AVA and CSEM data," SEG/San Antonio 2007 Annual Meeting, pp. 457-460.
Commer, M. et al. (2008), "New advances in three-dimensional controlled-source electromagnetic inversion," *Geophysics J. Int.* 17, pp. 513-535.
Draganov, D. et al., "Migration Methods for Passive Seismic Data," *SEG Expanded Abstracts* 23, 4 pgs.
Duncan, P.M. (2005), "Passive Seismic: Something Old, Something New," Search and Discovery Article #40153, 4 pgs.
Dziewonski, A.M. et al. (1981), Preliminary reference Earth model, *Physics of the Earth and Planetary Interiors* 25, pp. 297-356.
Dziewonski, A.M. et al. (1981), "Determination of Earthquake Source Parameters from Waveform Data for Studies of Global and Regional Seismicity," *J. of Geophysical Research* 86(B4), pp. 2825-2852.
Edme, P. et al. (2008), "Receiver function method in reflection seismology," *Geophysical Prospecting* 56, pp. 327-340.
Foss, S-K. et al. (2005), "Depth-consistent reflection tomography using PP and PS seismic data," *Geophysics* 70(5), pp. U51-U65.

Heincke, B. et al. (2006), "Joint Inversion of MT, Gravity and Sesimic Data applied to sub-basalt Imaging," SEG/New Orleans 2006 Annual Meeting, pp. 784-789.
Hohl, D. et al. (2006), "Passive Seismic Reflectivity Imaging with Ocean-Bottom Cable Data," SEG/New Orleans 2006 Annual Meeting, pp. 1560-1564.
Hou, Z. et al. (2006), "Reservoir-parameter identification using minimum relative entropy-based Bayesian inversion of seismic AVA and marine CSEM data," *Geophysics* 71(6), pp. O77-O88.
Jin, S. et al. (2000), "Shear-wave velocity and density estimation from PS-wave AVO analysis: Application to an OBS dataset from the North Sea," *Geophysics* 65(5), pp. 1446-1454.
Jupp, D.L.B. et al. (1977), "Resolving Anisotropy in Layered Media by Joint Inversion," *Geophysical Prospecting* 25, pp. 460-470.
Kapotas, S. et al. (2004), "The leap to passive seismic imaging, is it time?" SEG Int'l. Exploration and $74^{th}$ Annual Meeting, 4 pgs.
Langston, C.A. (1979), "Structure Under Mount Rainier, Washington, Inferred from Teleseismic Body Waves," *J. of Geophysical Research* 84(B9), pp. 4749-4762.
Liu, Z. (1997), "An analytical approach to migration velocity analysis," *Geophysics* 62(4), pp. 1238-1249.
Martakis, N. et al. (2006), "Integrated passive seismic acquisition and methodology, Case Studies," *Geophysical Prospecting* 54, pp. 829-847.
Montelli, R. et al. (2004), "Finite-Frequency Tomography Reveals a Variety of Plumes in the Mantle," *Science* 303, pp. 338-343.
Newman, G.A. et al. (1997), "hree-dimensional massively parallel electromagnetic inversion—I. Theory," *Geophysical J. Int.* 128, pp. 345-354.
Nowack, R.L. et al. (2006), "Correlation Migration Using Gaussian Beams of Scattered Teleseismic Body Waves," *Bull. of the Seismological Society of America* 96(1), pp. 1-10.
Pavlis, G.L. (2003), "Imaging the earth with passive seismic arrays," *The Leading Edge*, pp. 224-231.
Phinney, R.A. (1964), "Structure of the Earth's Crust from Spectral Behavior of Long-Period Body Waves," *J. of Geophysical Research* 69(14), pp. 2997-3017.
Ritsema, J. et al. (2009), "Seismic imaging of structural heterogeneity in Earth's mantle: Evidence for large-scale mantle flow," *Science Progress* 83, pp. 243-259.
Romanowicz, B. (2003), "3D structure of the Earth's lower mantle," *C.R. Geoscience* 335, pp. 23-35.
Ryberg, T. et al. (2000), "Receiver function arrays: a reflection seismic approach," *Geophys. J. Int.* 141, pp. 1-11.
Saltzer, R. et al. (2005), "Predicting $V_{shale}$ and porosity using cascaded seismic and rock physics inversion," *The Leading Edge*, pp. 732-736.
Sarkar, S. et al. (2008), "Eight Years of Passive Seismic Monitoring at a Petroleum Field in Oman: A Case Study," SEG/Las Vegas 2008 Annual Meeting, pp. 1397-1401.
Schuster, G.T. et al. (2004), "Interferometic/daylight seismic imaging," *Geophysic J. Int.* 157, pp. 838-852.
Shapiro, S. et al. (2005), "Porosity and elastic anisotropy of rocks under tectonic stress and pore-pressure changes," *Geophysics* 70(5), pp. N27-N38.
Shen, Y. et al. (1998), "Mantle Discontinuity Structure Beneath the Southern East Pacific Rise from P-to-S Converted Phases," *Science* 280, pp. 1232-1235.
Shragge, J. et al. (2006), "Teleseismic shot-profile migration," *Geophysics* 71(4), pp. S1221-S1229.
Symes, W.W. et al. (1991), "Velocity inversion by differential semblance optimization," *Geophysics* 56(5), pp. 654-663.
Symes, W.W. (2007), "Seismic Inversion: Progress and Prospects," SEG $77^{th}$ Annual Meeting, 30 pgs.
Tian, X. et al. (2005), "Joint imaging by teleseismic converted and multiple waves and its application in the INDEPTH-III passive seismic array," *Geophysical Research Letters* 32, L21315, 4 pgs.
Torii, K. et al. (2007), "Application seismic interferometry to natural earthquakes measured by small-scale array," SEG/San Antonio 2007 Annual Meeting, pp. 1362-1366.
Tselentis, G-A. et al. (2007), "Local high-resolution passive seismic tomography and Kohonen neural networks—Application at the Rio-Antirio Strait, central Greece," *Geophysics* 72(4), pp. B93-B106.

(56) References Cited

OTHER PUBLICATIONS van Leeuwen, T. et al. (2007), "Data-correlation for velocity inversion," SEG/San Antonio 2007 Annual Meeting, pp. 1800-1804.
Wagner, D. et al. (2007), "Joint inversion of active and passive seismic data in Central Java," *Geophysics J. Int.* 170, pp. 923-932.
Waldhauser, F. (2000), "A Double-Difference Earthquake Location Algorithm: Method and Application to the Nothern Hayward Fault, California," *Bulletin of the Seismological Society of America* 90, pp. 1353-1368.
Wapenaar K. (2004), "Retrieving the Electrodynamic Green's Function of an Arbitrary Inhomogenous Medium by Cross Correlation," *PRL* 93, pp. 254301-254304.
Wilson, D. et al. (2003), "Imaging crust and upper mantle seismic structure in the southwestern United States using teleseismic receiver functions," *The Leading Edge*, pp. 232-237.
Woodhouse, J.H. et al. (1984), "Mapping the Upper Mantle: Three-Dimensional Modeling of Earth Structure by Inversion of Seismic Waveforms," *J. of Geophysical Research* 80(B7), pp. 5933-5986.
Xu, S. et al. (1995), "A new velocity model for clay and mixtures," *Geophysical Prospecting* 43, pp. 91-118.
Xu, S. et al. (1996), "A physical model for shear-wave velocity prediction," *Geophysical Prospecting* 44, pp. 687-717.
Yilmaz, O. (2006), "Earthquake Seismology, Exploration Seismology, and Engineering Seismology: How Sweet It is—Listening to the Earth," $6^{th}$ Int'l. Conf. & Exposition on Petrolium Graphics, pp. 1387-1391.
Yu, J. et al. (2006), "Crosscorrelogram migration of inverse seismic profile data," *Geophysics* 71(1), pp. S1-S11.

* cited by examiner

US 8,923,094 B2

HYDROCARBON DETECTION WITH PASSIVE SEISMIC DATA

CROSS REFERENCE TO RELATED APPLICATIONS

This application is the National Stage of International Application No. PCT/US2009/067913, filed 14 Dec. 2009, which claims the benefit of U.S. Provisional Application No. 61/143,695, filed 9 Jan. 2009, and U.S. Provisional Application No. 61/267,695, filed 8 Dec. 2009, each of which is incorporated herein by reference, in its entirety, for all purposes.

FIELD OF THE INVENTION

This invention pertains generally to hydrocarbon exploration and, more particularly, to inferring the presence or absence of hydrocarbons in the subsurface. Specifically, the invention is a method for using seismic data generated by passive seismic sources such as earthquake activity in conjunction with other geophysical data for petroleum exploration.

BACKGROUND OF THE INVENTION

Current hydrocarbon seismic exploration methods mainly rely on active seismic sources, i.e. sources controlled by the survey operator, to generate seismic energy. The recorded seismic signals from such sources are used to form images of reflector locations and to derive physical properties of the subsurface. However, current active source seismic acquisition techniques are unable to provide reliable and useful data in the low-frequency regime below roughly 6-8 Hz. (The more powerful explosions necessary to generate lower frequencies are not acceptable seismic survey activity because of environmental and societal impact.) The lower frequencies that are missing from this data contain information on the background trends in the rock properties. In addition, this information is important for stabilizing and steering pre-stack seismic inversion to the correct solution, and for deriving absolute rock properties in the subsurface. This technical difficulty (called the low frequency lacuna) renders advanced gradient-based seismic data inversion/imaging algorithms useless in problem data areas where conventional seismic data processing methods notoriously fail.

Current practices for addressing the low frequency lacuna involve estimating some portion of the missing spectrum of the earth model (generally information at the very bottom 0-2 Hz) and might include moveout-based velocity analysis (Liu, "An analytical approach to migration velocity analysis", *Geophysics* 62, 1238-1249 (1997)), or reflection tomography methods (Foss, et. al., "Depth-consistent reflection tomography using PP and PS seismic data", *Geophysics* 70, U51-U65 (2005)), or constructing subsurface models from seismic interpretation of the major reflectors observed in the 2D or 3D seismic reflection data. Unfortunately this approach fails if a satisfactory imaging velocity cannot be found in the pre-stack data.

What is needed is a source of data filling the low frequency lacuna, and a way to exploit such data to supplement the predictions and analyses made from seismic data that are so useful in petroleum exploration and production.

SUMMARY OF THE INVENTION

In one embodiment, the invention is a method for hydrocarbon detection in a subsurface region using passive-source seismic data in conjunction with at least one other type of geophysical data, comprising:

(a) obtaining passive-source seismic survey data for the subsurface region, wherein the survey's receivers were seismometers located generally over said subsurface region and spaced for hydrocarbon prospecting, said seismometers being suitable for global seismology earthquake detection, and wherein said passive-source seismic data include at least one event identified in an earthquake table and estimated to have a dominant frequency at the subsurface region in a range of 0 to 8 Hz based on said at least one event's magnitude and distance from the subsurface region;

(b) obtaining at least one other type of geophysical data for the subsurface region, selected from a group consisting of active-source seismic, controlled source electromagnetic, magnetotelluric, magnetic, and gravity;

(c) deriving a physical properties model giving values of at least one physical property at different locations in the subsurface region by simultaneously using at least part of the passive-source seismic data and the at least one other type of geophysical data; and (d) using the physical properties model to predict hydrocarbon potential for the subsurface region.

Persons who work in the field of geophysical data processing will readily recognize that for practical applications of the present inventive method, at least step (c) above must be performed with the aid of a computer, i.e. a data processing machine, programmed in accordance with the invention description that follows.

BRIEF DESCRIPTION OF THE DRAWINGS

The present invention will be better understood by referring to the following detailed description and the attached drawings in which.

The invention will be described in connection with example embodiments. However, to the extent that the following description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

Figure 1:
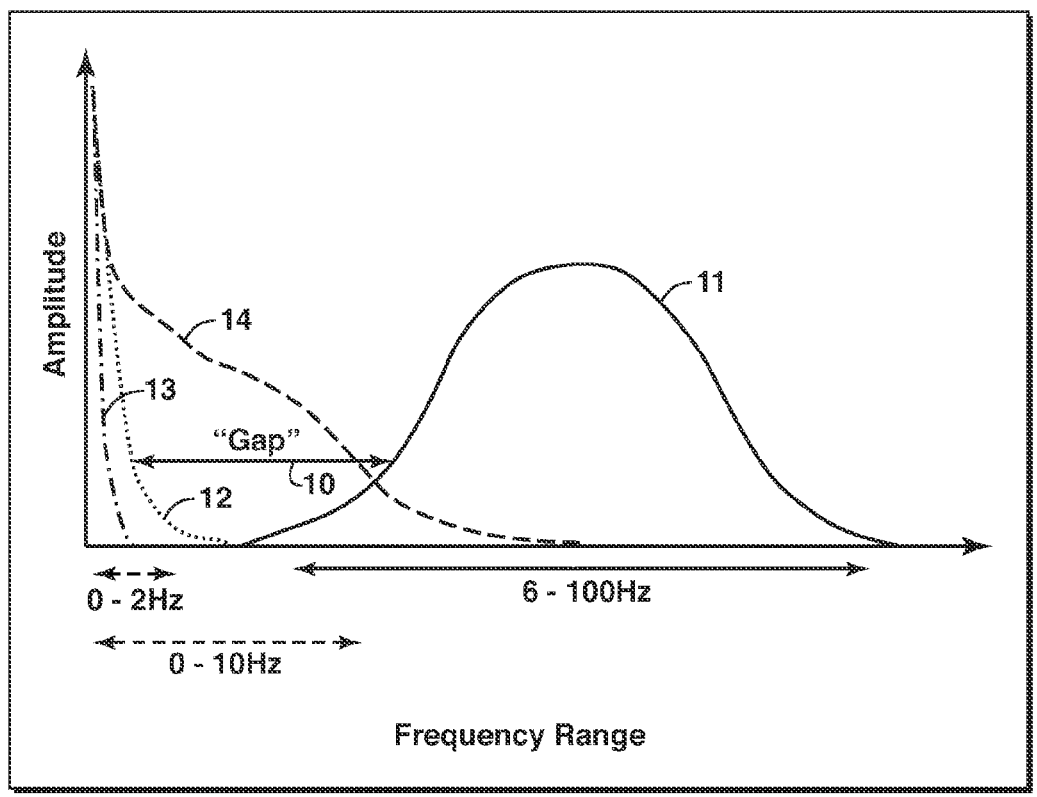
FIG. 1 is a schematic plot illustrating the frequency content of different types of data.

Other types of geophysical data help fill the frequency gap below active-source seismic to a limited degree. FIG. 1 shows approximately where the various types of geophysical data fit into the picture. The solid line curve 11 represents active seismic data. The approximate useful frequency range for controlled source electromagnetic ("CSEM") data is represented by curve 12, and curve 13 shows the frequency range for gravity and NMO (normal moveout) velocity data. Even with these known data types supplementing at the very low frequencies, there remains the frequency gap 10. The present invention uses passive source seismic data, primarily earthquake data, to fill this gap, and teaches how to exploit these data.

Passive seismic data have potential to fill the gap because such data can be rich in low frequency information. Earthquakes including tremors, volcanos, and disturbances of all magnitudes, and tidal waves are examples of passive seismic sources, which can be defined as seismic signals generated by natural sources or by man-made sources not employed purposefully in a seismic data acquisition program. Man-made disturbances may be present as noise because it may not be possible to entirely exclude incidental events such as road construction reverberations from the desired earthquake data. The curve 14 in FIG. 1 indicates the approximate frequency range that earthquakes can provide. Curve 14 is obviously very advantageously positioned relative to gap 10. It is particularly obvious from FIG. 1 how passive-source seismic data complements active source seismic data in terms of frequency bandwidth. However, it may also be advantageous to combine earthquake data with, for example, CSEM (or magneto-telluric or gravity) data to produce a superior velocity model for depth migration, particularly in areas of complex shallow geology such as sub-basalt, sub-salt and fold and thrust belts where standard velocity estimation methods do not work very well. Because the seismic source is not at the surface directly above the region of interest, passive seimic data results from the transmission of acoustic waves through the earth to surface detectors, rather than the reflection of seismic waves at interfaces directly above and below the region of interest which is the basis for active-source seismic surveying.

Figure 12:
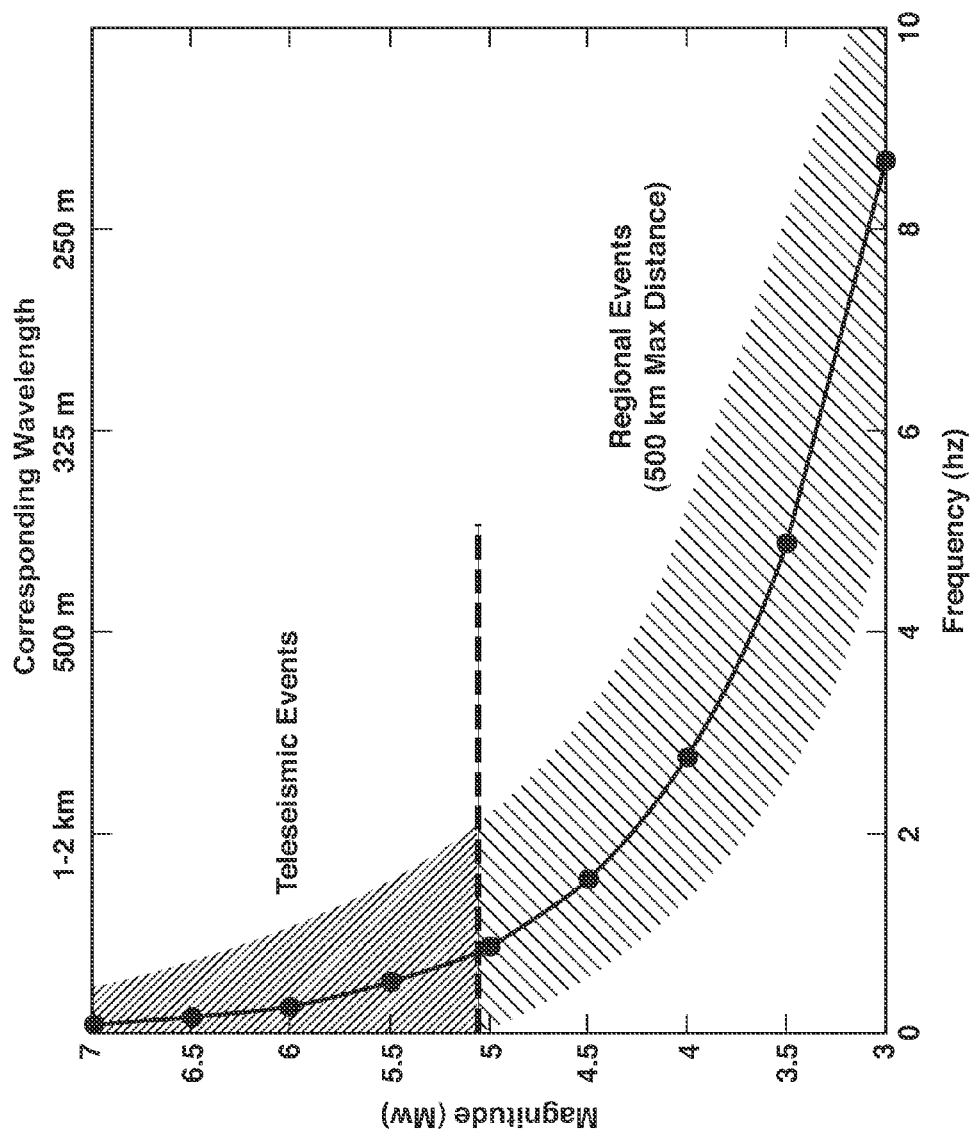
FIG. 12 is a plot of earthquake magnitude versus earthquake frequency content expressed by the dominant frequency.

The earthquakes of most interest to this invention are large events (generally larger than magnitude 3.0) that are likely to occur far away from the region of interest (hundreds to thousands of kilometers away). FIG. 12 shows a calculation of earthquake frequency content versus earthquake magnitude. The larger the earthquake, the more low-frequency energy that tends to be emitted. Moreover, the earth acts as a filter, which means that the further away an earthquake occurs, the more strongly the high-frequencies will be attentuated. Consequently, large earthquakes that occur far away will arrive at a recording station with lower frequency content, i.e. a lower dominant frequency, than earthquakes of a similar or lesser magnitude that occur nearer to the recording station. Earthquakes greater than magnitude 3.0 or 4.0 will likely contain energy within the desired frequency range for this invention, i.e, within the frequency gap 10, although the stress drop is what ultimately determines the amount of energy emanated. It should be noted that the earthquakes required in this invention to provide low frequency information differ from microearthquakes which are used to monitor gas and oil production. Micro-earthquakes are due to slip on tiny little faults and therefore have a typical frequency content of 10's to 100's of Hz, which can possibly contribute to a better result but cannot help to fill in the low-frequency gap indicated in FIG. 1.

Earthquakes provide lower frequency vibrations than human operated seismic sources because of the magnitude of the disturbance, which increases the low frequency content. For example, a magnitude 1.0 earthquake is roughly equivalent to the energy release from an explosion of about 70 pounds of TNT (a mid-sized construction site blast), which is larger than most explosions set off for seismic survey purposes. A magnitude 2.0 earthquake is similar to an explosion of 1 metric ton of TNT, and a magnitude 4.0 earthquake is approximately equivalent to the energy release from an explosion of 1,000 tons of TNT (a small nuclear blast). Other examples include the 1980 Mount St. Helens eruption, which released the energy equivalent of a magnitude 7.8 earthquake (or just over 500 megatons of TNT), and the 1883 Krakatoa eruption, which released the energy equivalent of a magnitude 8.5 earthquake (or about 5.6 gigatons of TNT). More information about natural sources can be obtained from the U.S. Geologic Survey, for example at: http://hvo.wr.usgs-.gov/volcanowatch/2008/08_02_21.html.

For decades, global seismologists have used data recorded from naturally occuring earthquakes to image the earth's interior on a large scale. Typical techniques for extracting information from these data include measuring the delay travel times and performing travel time tomography. See, for example, Dziewonski and Romanowicz, "Overview of Volume I: Seismology and Structure of the Earth," *Treatise of Geophysics* Vol. 1, published by Elsevier (2007); Ritsema, and van Heijst, "Seismic Imaging of Structural Heterogeneity in Earth's Mantle: Evidence for Large-Scale Mantle Flow," *Science Progress* 83, 243-259 (2000); Dziewonski and Anderson, "Preliminary Reference Earth Model (PREM)," *Phys. Earth Planet. Inter.* 25, 297-356 (1981); Romanowicz, "The 3D Structure of the Lower Mantle," *Comptes Rendus Acad. Sciences* 335, 23-36 (2003); Montelli et al., "Finite-Frequency Tomography Reveals a Variety of Plumes in the Mantle," *Science* 303, 338-343 (2004). Other techniques involve analyzing converted phases via receiver functions and obtaining estimates of the discontinuity structure and/or scattered wavefield; see, for example, Langston, "Structure Under Mount Rainier, Wash., Inferred from Teleseismic Body Waves," *J. Geophys. Res.* 84, 4749-4762 (1979); and Phinney, "Structure of the Earth's Crust from Spectral Behaviour of Long-Period Body Waves," *J. Geophys. Res.* 69, 2997-3017 (1964). Shen et al. take passive seismic data from earthquakes and use receiver functions to image the earth's discontinuity structure at depth (e.g., the 670 Km discontinuity or the 410 Km discontinuity or even the crust-mantle (Mohorovicic discontinuity) by analyzing seismic waves that have undergone phase conversion (i.e. P to S converted phase) (Shen et. al., "Mantle Discontinuity Structure Beneath the Southern East Pacific Rise from P-to-S Converted Phases," *Science* 280, 1232-1235 (1998)).

In "Joint Inversion of Active and Passive Seismic Data in Central Java," *Geophysical Journal International* 170, 923-932 (2007), Wagner et al. describe deploying a passive seismic network of 120 seismometers in a grid with 10-20 km spacing around the Merapi volcano. The network was supplemented by 9 ocean bottom seismometers in the water. The seismometers recorded continuously for 18 to 21 weeks. In addition, 3-D active seismic experiments were carried out offshore using airguns and streamers. The two datasets were jointly inverted to obtain a velocity model with 5 km node spacing. First arrival traveltimes from three of the active seismic reflection profiles were jointly inverted with the arrival times of 292 local earthquakes in order to improve upon the velocity model that had been obtained with just the passive data alone. See also Buske et al., "Active and Passive Seismic Imaging of the San-Andreas-Fault System," *European Geosciences Union Abstract* (2007).

Passive seismic data have been used for hydrocarbon exploration and reservoir monitoring and characterization, by techniques that include seismic trace cross-correlation or interferometric techniques, which convert transmission seismic data to reflection seismic data; see for example Claerbout, "Synthesis of a Layered Medium From its Acoustic Transmission Response," *Geophys.* 33, 264 (1968); and Wapenaar, "Retrieving the Elastodynamic Green's Function of an Arbitrary Inhomogeneous Medium by Cross Correlation," *Phys. Rev. Lett.* 93, 254301 (2004). Efforts in trying to image subsurface with the passive seismic data for hydrocarbon exploration can be found in recent publications, Artman, "Imaging Passive Seismic Data" *Geophys.*, 71, no. 4, SI177-SI187 (2006); Hohl et. al., "Passive Seismic Reflectivity Imaging with Ocean-Bottom Cable Data," *SEG Extended Abstract,* 1560-1564 (2006); Duncan et. al., "Passive Seismic: Something Old, Something New," *Search and Discovery*, Article #40154 (2005); and Dragonov et al., "Migration Methods for Passive Seismic Data," *SEG Technical Program Expanded Abstracts* 23, 1560-1564. However, due to the limitations in data frequency content and poor source and receiver coverages, the passive seismic data have not proved useful for hydrocarbon exploration except in the area of reservoir monitoring and characterization in the production enviroment with microearthquakes (S. A. Shapiro, et. al., *Geophysics* 70, F27-F33; S. Sarkar, et. al., "Eight Years of Passive Seismic Monitoring at a Petroleum Field in Oman: A case study", *SEG Extended Abstract*, (2008)). As used herein, the term microearthquake (or micro-seismic or micro-tremor) will refer to low magnitude, naturally occurring seismic events originating below the survey seismometers, i.e. in or below the survey target region. Such events are too small to be identified in earthquake catalogs or similar tabulations of global earthquake locations. All of the petroleum applications listed in this paragraph obtained their passive seismic data from very local, microseismic activity or local cultural noise (drilling, boat, rig, etc.). Micro-seismic earthquakes are located by measuring arrival times and inverting those times to determine earthquake location.

A few publications have discussed using earthquake data or techniques for hydrocarbon prospecting, including those that are summarized next. All of these papers disclose using nearby micro-earthquakes (not teleseismic earthquakes) to do tomographic inversion for better Vp and or Vp/Vs models. In contrast to this, the present inventive method uses earthquake data that includes at least one large magnitude event jointly (simultaneously) with at least one other geophysical data type (e.g., active seismic data) to obtain a better velocity model or migration image or prediction of rock properties or estimate of hydrocarbon potential. The joint inversion of active seismic data and such a passive seismic dataset will help to reduce the frequency gap or lacuna that plagues active seismic inversions. The joint inversion of passive seismic datasets with potential fields data, such as gravity, magnetic or CSEM data will bring observations of different rock properties (e.g., velocity, resisitivity, density) together, even though the frequency band of the various measurements is similar In *Earthquake Seismology, Exploration Seismology, and Engineering Seismology: How Sweet it is—Listening to the Earth*, SEG Annual Meeting (2007), Yilmaz describes three bandwidths, three depth-widths and a case study for each:

1. Earthquake seismology. Has a bandwidth up to 10 Hz. Case study describes a seismic refraction survey, recording at 16 locations, picking first arrival times, and estimating the P and S wave velocity structure (down to 30 m depth) by inverting those travel times.
2. Exploration Seismology. Has a bandwidth up to 100 Hz, but the low frequency cutoff is about 4 Hz. Case study describes a multi-channel large-offset 2-D seismic survey with shots and receivers.
3. Engineering Seismology. Has a bandwidth up to 1000 Hz. Case study describes using 10 Hz geophones and an explosive source to acquire shot records that were processed for reflections and refractions. Rayleigh wave inversion was used to derive an S-velocity profile in depth.

In "Integrated Passive Seismic Acquisition and Methodology, Case Studies," *Geophysical Prospecting* 54, 829-847 (2006), Martakis et al. describe using natural micro-seismicity as seismic sources. Micro-seismicity is generally taken to be Mw≤0. (Earthquake magnitudes are expressed on a logarithmic scale, and thus very small earthquakes have negative magnitudes.) A hydrocarbon exploration case study describes 40 stations covering an area of 3000 $km^2$ that recorded for 10 months (i.e., station spacing of at least 10 km). A total of 900 earthquakes were recorded of which half (450) were used for tomographic inversion because those 450 events were (1) located within the seismic network and (2) had at least 20 P- and S-wave arrivals and (3) had estimated location errors of less than 1 km. The inversion grid was 2 km by 4 km. A second case study involved recording 200 micro-earthquakes with magnitudes between −0.5 and 3.0, locating the hypocenters, and determining the velocity structure via tomographic inversion. Station spacing was 500 m in this example. The authors suggest that passive seismic data can be used as (1) a reconnaissance tool in order to optimize the cost of 3D conventional seismic surveys and (2) as a complementary method for reinterpretation of 2D regional seismic data or reprocessing of 2D seismic data by using the velocity model derived from the passive seismic data.

In "Local High-Resolution Passive Seismic Tomography and Kohonen Neural Networks—Application at the Rio-Antirio Strait, Central Greece," *Geophysics* 72, B93-B106 (2007), Tselentis et al. describe a micro-earthquake network of 70 stations at 500 m spacing that recorded 220 local micro-earthquake events. These events were used to determine a 1D velocity model. That model was then used as the initial model for a nonlinear inversion of 3D P- and S-velocity crustal structure, which relocated the earthquakes and solved for the velocity structure at the same time in an iterative fashion. The retrieved Vp and Vp/Vs images were used as an input to a neural network to identify prominent lithologies in the region In "Application Seismic Interferometry to Natural Earthquakes Measured by Small-Scale Array," *SEG Annual Meeting* (2007), Torii et al. describe using interferometric methods with passive seismic data (micro-earthquakes) to image the subsurface. Their technique is similar to that described by Artman (op.cit.) or Schragge et al., "Teleseismic Shot-Profile Migration," *Geophysics* 71, SI221-SI229 (2006)), but specifically discusses using micro-earthquakes.

In PCT Patent Application Publication WO 2008/087505 ("Time Reverse Reservoir Localization"), Saenger et al. disclose acquiring passive seismic data, inverting the data or otherwise "time reversing" the data, to determine the location of subsurface hydrocarbon reservoirs from high amplitude regions in output displays. However, Saenger is relying on hydrocarbon reservoirs' possessing the property to act as a resonator of low-frequency waves when mechanically forced at some particular frequency. Saenger is not using specific earthquake events, and in fact regards earthquakes as noise that should be removed so that the signal being emanated by the hydrocarbon reservoir may be observed. By processing the data to determine the location of the resonator, Saenger et al. thereby assume they have located a hydrocarbon reservoir. One drawing (8C) showing the invention applied to actual field data is somewhat difficult to interpret, possibly because it is a black and white reproduction of a color display. The publication briefly mentions that seismic signals due to, for example, "cultural and industrial noise," can contribute unwanted noise that may be removed by data processing techniques.

In "The Leap to Passive Seismic Imaging, Is It Time?" *SEG Annual Meeting* (2004), Kapotas et al. describe the objectives of tomographic inversion to be (1) 3D Vp (structural) and (2) Vp/Vs (lithologic) information via inversion of P and S-wave travel times from natural micro-earthquakes. The paper concludes by suggesting that focal mechanisms (describes the earthquake rupture), stress and moment tensors (describes how energy released), and volumetric b-values from passive data can lead us to better understanding of fracture distribution and characteristics of the production zone.

The present invention in some of its embodiments is a method for using passive source earthquake data in conjunction with at least one other geophysical datatype for hydrocarbon exploration. The passive data must be acquired with a dense survey design, i.e. receiver spacing suitable for hydrocarbon exploration. Receiver spacing for hydrocarbon exploration is typically less than 1 km, preferably less than 250 m. Techniques developed within the earthquake seismology community are modified for exploring targets that are smaller than such large scale targets as the Earth's crust. In another of its aspects, the present invention derives earth rock property model(s) by jointly using passive seismic data together with at least one other type of non-seismic geophysical data such as active source seismic reflection data, controlled source electromagnetic (CSEM), magnetotelluric (MT), magnetic and gravity or gravity gradiometry data. The present invention provides a way to close the low frequency gap or lacuna (between 0 and ~5 to 8 Hz) which plagues active source seismic techniques currently available and to improve joint inversion of multiple geophysical data.

Figure 11:
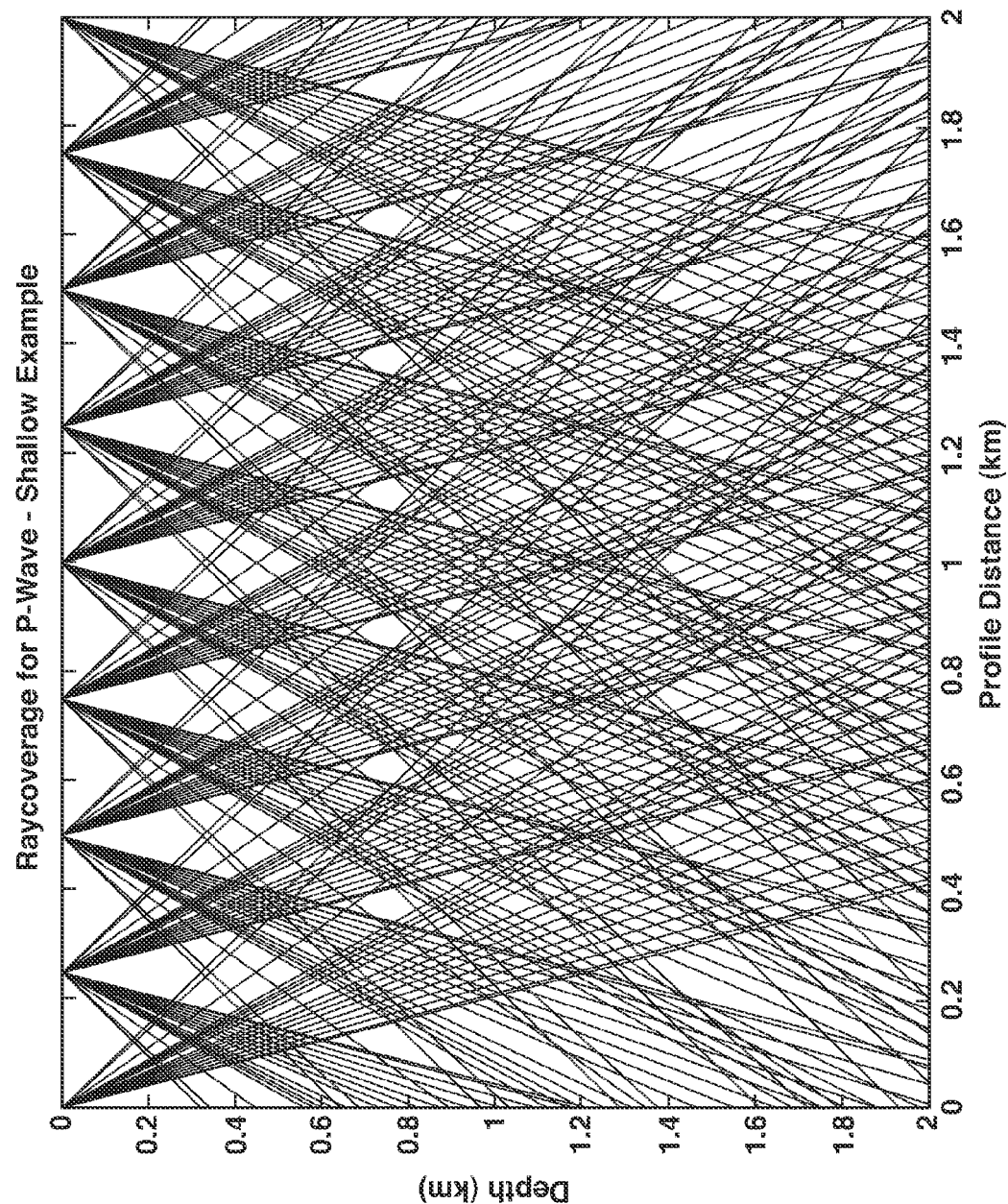
FIG. 11 is a graph showing computed ray coverage from regional and teleseismic events at a producing field in the western United States.

Teleseismic earthquake data have been used to image the large-scale, velocity structure of the deep earth, but not for imaging of subsurface structure on a local (hydrocarbon exploration) scale. It has been commonly held that earthquake data, particularly teleseismic events, are not suitable for imaging in hydrocarbon applications because the sources cannot be controlled (i.e., don't occur where or when one might like) and because the arrival angle of such rays at the detector is nearly vertical, making the points where rays going to one receiver cross rays going to another receiver occur very deep. Where rays cross is where one can expect to resolve structure and hence have acceptable resolution for tomographic imaging. A related objection has been that for such low frequencies, the Fresnel zone radius would be so large and hence resolution so poor that imaging would be unsuccessful. The present inventors computed the crossing ray distribution over a six-month period at a producing field in the western United States where a velocity model for the subsurface is reliably known. FIG. 11 shows the ray coverage that could be expected at that field for receiver spacing of 250 m for known teleseismic plus regional events occurring during the time period Jan. 1 to Oct. 1, 2007. The teleseismic rays are shown in black and the regional events in grey. FIG. 11 shows that contrary to traditional belief, earthquake data hold promise for imaging subsurface structure on a petroleum exploration scale, because they do not travel nearly as vertically as has been assumed and have better coverage than had been assumed, particularly if such data are collected for an extended period, e.g., six months.

Figure 13:
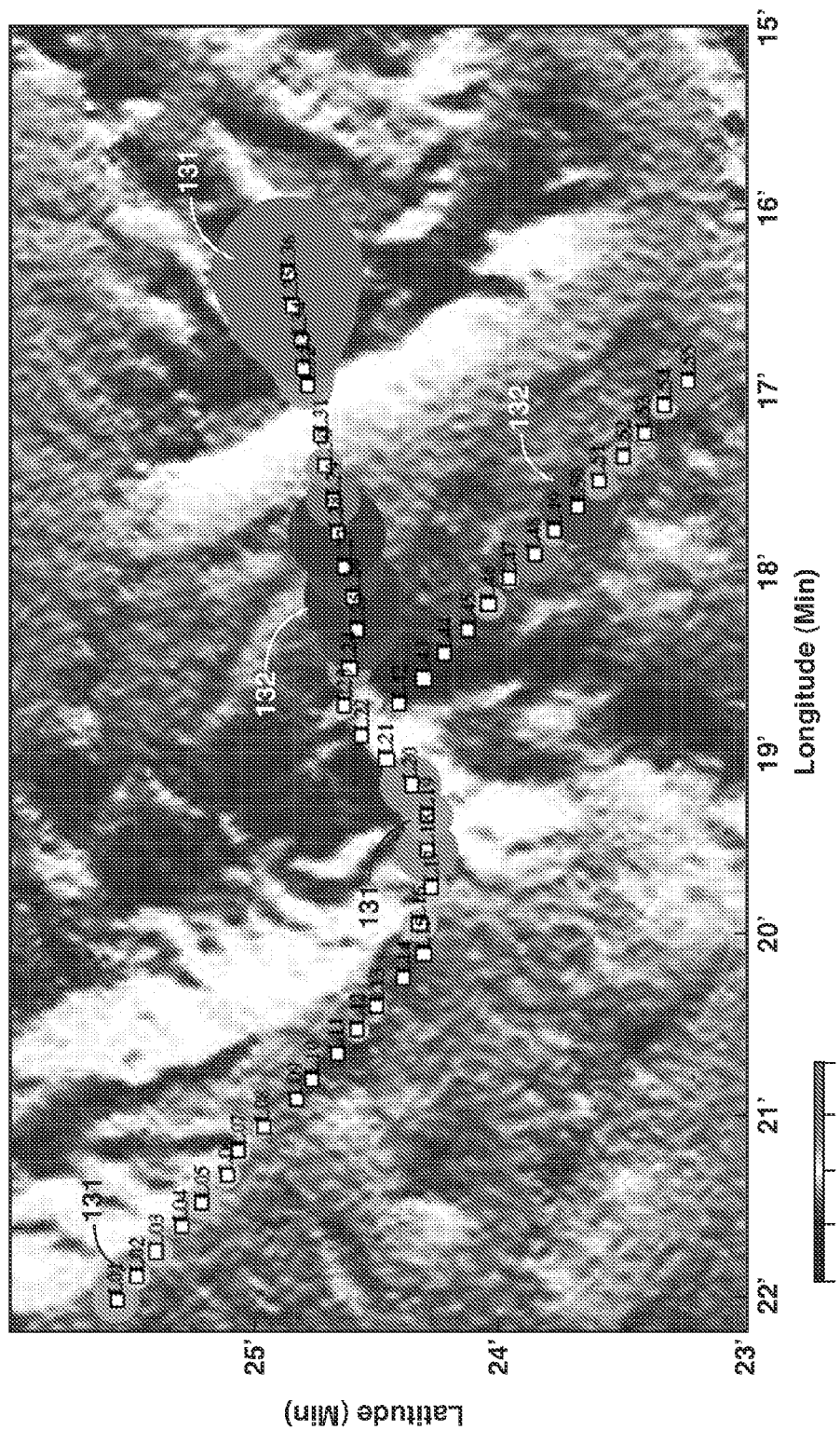
FIG. 13 is a map view display of travel time anomalies relative to a 1D earth model.
Figure 14:
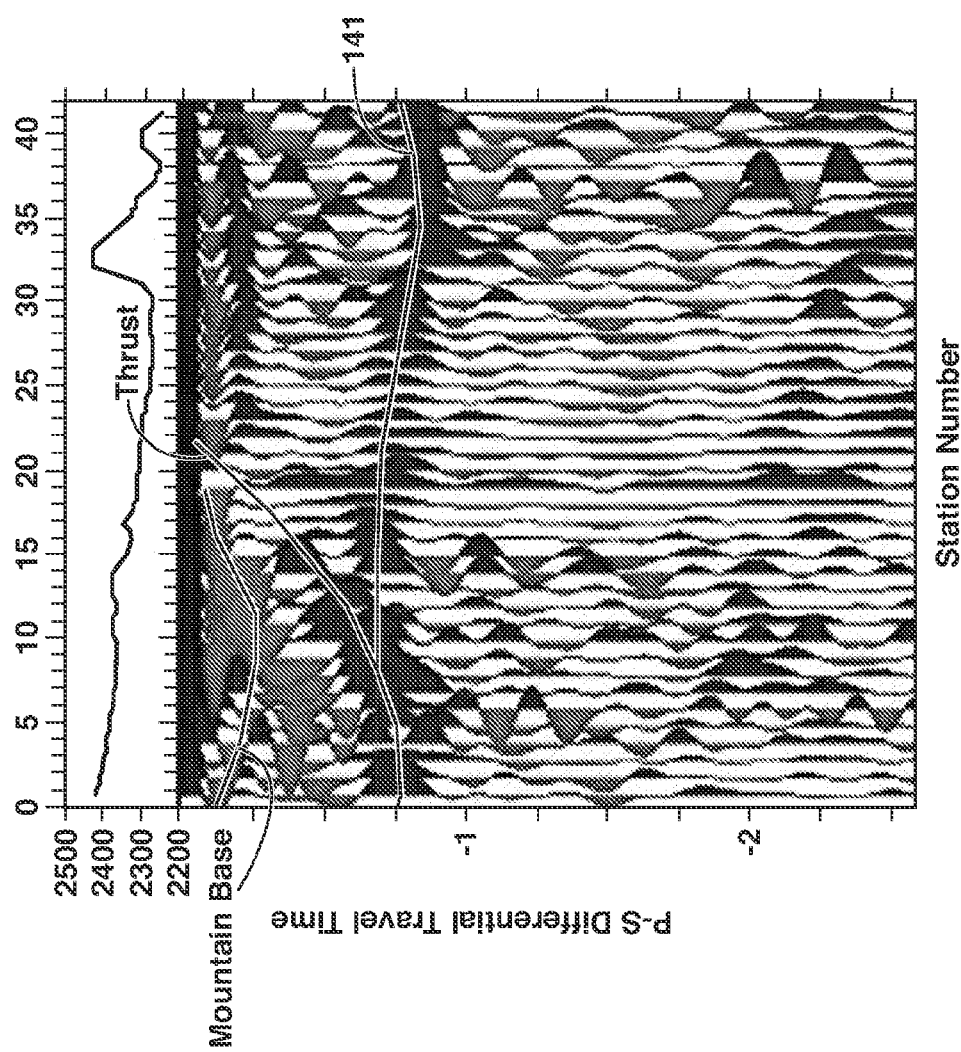
FIG. 14 shows receiver function results that reveal reflectors in a shallow crustal section where incoming P-waves converted to S-waves.

The inventors deployed an array of seismometers (~250 m spacing) over a producing field in the western United States for about 6 months time and recorded seismic data continuously at a rate of 100 samples per second. Preliminary analysis of these data find that relative travel time measurements can indeed be made (FIG. 13) and that the measured relative delays (or advances) are likely related to shallow velocity structure. In the drawing, 131 indicates travel times that are late relative to a 1D earth model, and 132 indicates early travel times. Receiver function analysis was performed on some of these data. Through this analysis, shallow reflectors such as the base of a 1 km thick carbonate package (thought of as a mountain base in the area) as well as a major thrust that has been inferred via active reflection methods are detectable as shown in FIG. 14, where reflectors are discernable in a shallow crustal section where incoming P-waves convert to S-waves. Converted phases that arrive ~0.8 s after the P-wave represent the boundary between clastic sediments and the granitic basement. A dipping reflector that is consistent with the mapped thrust in the region may also be seen. Both FIGS. 13 and 14 are black and white reproductions of color drawings or data displays due to patent restrictions. This work suggests that the earthquake data will be able to improve the velocity models used for migrating seismic data and hence also for joint inversion of multiple geophysical data.

In some embodiments of the invention, a first step (step 21 in the flow chart of FIG. 2) includes a passive seismic survey specifically designed for hydrocarbon exploration. This design preferably includes a station spacing much smaller (e.g., <1 km) than typically used in earthquake seismology work (generally 10's of km). The smaller spacing and continuous or triggered recording over a long period of time (step 22) is intended to allow resolution of shallow targets. The present inventive method can make full use of this dataset, including earthquakes of all distances (local, regional, teleseismic) all source (occuring naturally or man-made sources not employed purposefully) and wave (body and surface waves) types, and all magnitudes (including microseismic scale). Standard techniques used in earthquake seismological work can then be employed (step 23) such as but not limited to tomographic approaches, receiver functions, or the interferometric techniques, modified where necessary to target a smaller scale appropriate for hydrocarbon exploration.

It may be preferable in performing step 22 of the present inventive method to conduct continuous recording over a period of time, such as several months up to years, in order to gather a sufficient number of "sources". Typically, all events that are detectable by the survey seismographs are recorded, from microseismicity (very small earthquakes in the surrounding area of the receiver) to larger earthquakes thousands of kilometers away. There is an "indistinct" categorization in earthquake reporting, where earthquakes are sorted by their source-receiver distance: local (within the vicinity of the recording station), regional (up to 3000 km distance between source and receiver), and teleseismic (30-90 degrees distance). In the latter case, the seismic rays traverse through the Earth's mantle. Table 1 shows information published by the USGS, which demonstrates the frequency of occurrence of earthquakes (http://neic.usgs.gov/neis/eqlists/eqstats.html).

TABLE 1

| Magnitude | Average Annually |
|---|---|
| 8 and higher | 1[1] |
| 7-7.9 | 17[2] |
| 6-6.9 | 134[2] |
| 5-5.9 | 1319[2] |
| 4-4.9 | 13,000 (estimated) |
| 3-3.9 | 130,000 (estimated) |
| 2-2.9 | 1,300,000 (estimated) |

[1]Based on observations since 1900.
[2]Based on observations since 1990.

There are earthquakes happening somewhere at any given time. There are an infinite number of small events, sometimes called micro-tremors, (magnitude 2 or even smaller), up to ~1 per year with a magnitude 8 or higher. An earthquake of a magnitude of ~4.5 can in theory be recorded worldwide.

Earthquakes are defined by their origin times and hypocenters (i.e., x,y,z location of the event). Catalogs of earthquakes occurring anywhere in the world with a magnitude $M_w > 5.5$ are maintained by scientists funded by the National Science Foundation and made publicly available (published annually in Physics of the Earth and Planetary Interiors and posted on the internet). Published papers describing the Centroid Moment Tensor (CMT) methodology for locating and describing earthquakes include: Dziewonski and Woodhouse, "An Experiment in the Systematic Study of Global Seismicity: Centroid Moment Tensor Solutions for 201 Moderate and Large Earthquakes of 1981," *J. Geophysi. Res* 88, 3247-3271 (1983); Dziewonski et al., "Determination of Earthquake Source Parameters from Waveform Data for Studies of Global and Regional Seismicity," *J. Geophys. Res.* 86, 2825-2852 (1981); and Woodhouse and Dziewonski, "Mapping the Upper Mantle: Three Dimensional Modeling of Earth Structure by Inversion of Seismic Waveforms," *J. Geophys. Res.* 89, 5953-5986 (1984).

Permanent arrays of global seismometers are used to locate earthquakes occurring all over the world. The procedure for locating an earthquake is to observe the times at which the wavefront passes each seismic station. The location, depth and origin time of the earthquake are inferred typically via an inversion of the observed travel times. The process usually begins with an initial guess of the hypocenter, and then the hypocenter location is iteratively updated until a final location is found that best predicts the observed arrival times at the stations in the seismic network. An example of data from an earthquake catalog, showing magnitudes, times and locations of a series of earthquakes is given in Table 2. Moreover, earthquake catalogs provide more information on the fault that ruptured, for example its length, angle, and direction of slip.

TABLE 2

| | | | | | | |
|---|---|---|---|---|---|---|
| | | | | Type Of Search | | |
| Date | Latitude | Longitude | Depth (Km) | Magnitude | Location | Engine Used |
| 2008, Mar. 26 07:02:37 | 58.19 | −151.51 | 9.1 | 4.0 M | KODIAK ISLAND REGION | FINGER |
| 2008, Mar. 26 07:02:37 | 63.245 | −151.351 | 11 | 3.6 ML | CENTRAL ALASKA | QED |
| 2008, Mar. 26 09:19:31 | 44.493 | 9.887 | 58 | 4.4 MB | NORTHERN ITALY | QED |
| 2008, Mar. 26 10:39:27 | 35.657 | 81.717 | 10 | 5.2 MB | SOUTHERN XINJIANG, CHINA | QED |
| 2008, Mar. 26 11:36:53 | 55.284 | 163.152 | 22 | 4.8 MB | OFF EAST COAST OF KAMCHATK | QED |
| 2008, Mar. 26 11:37:53 | 47.034 | 152.682 | 63 | 5.0 MB | KURIL ISLANDS | QED |
| 2008, Mar. 26 13:57:16 | −22.132 | −178.184 | 373 | 5.0 MB | SOUTH OF FIJI ISLANDS | QED |
| 2008, Mar. 26 14:03:59 | 47.334 | −122.331 | 23 | 2.5 MD | WASHINGTON | QED |
| 2008, Mar. 26 20:06:05 | 13.572 | 144.916 | 65 | 5.4 MB | MARIANA ISLANDS | QED |
| 2008, Mar. 27 01:07:13 | 36.466 | −113.594 | 5 | 3.6 ML | WESTERN ARIZONA | QED |
| 2008, Mar. 27 01:28:11 | 36.562 | −113.624 | 5 | 2.6 ML | WESTERN ARIZONA | QED |
| 2008, Mar. 27 04:28:49 | 33.627 | −117.906 | 11 | 3.0 ML | SOUTHERN CALIFORNIA | QED |
| 2008, Mar. 27 08:01:35 | 37.926 | −121.801 | 15 | 3.2 ML | CENTRAL CALIFORNIA | QED |
| 2008, Mar. 27 09:42:59 | 17.372 | −84.809 | 10 | (null) (null) | NORTH OF HONDURAS | QED |
| 2008, Mar. 27 12:13:17 | 33.98 | −118.4 | 12 | 2.4 ML | SOUTHERN CALIFORNIA | QED |
| 2008, Mar. 27 14:22:17 | −7.81 | 107.993 | 113 | 4.8 MB | JAWA, INDONESIA | QED |
| 2008, Mar. 27 19:25:41 | −3.867 | 141.932 | 70 | 5.0 MB | NEW GUINEA, PAPUA NEW GUIN | QED |
| 2008, Mar. 27 21:10:02 | 45.975 | 142.581 | 317 | 4.4 MB | HOKKAIDO, JAPAN REGION | QED |
| 2008, Mar. 27 22:45:39 | 14.153 | 145.035 | 108 | 5.0 MB | MARIANA ISLANDS | QED |
| 2008, Mar. 27 23:07:44 | 59.165 | −152.381 | 68 | (null) (null) | SOUTHERN ALASKA | QED |
| 2008, Mar. 27 23:23:07 | −16.421 | −68.401 | 202 | 4.6 MB | PERU-BOLIVIA BORDER REGION | QED |
| 2008, Mar. 28 00:16:21 | 34.949 | 25.363 | 47 | (null) (null) | CRETE | QED |
| 2008, Mar. 28 01:35:19 | 1.891 | 128.455 | 67 | 5.0 MB | HALMAHERA, INDONESIA | QED |
| 2008, Mar. 28 02:46:49 | 52.59 | −163.264 | 31 | 4.0 MB | SOUTH OF ALASKA | QED |
| 2008, Mar. 28 06:39:47 | −32.836 | 179.257 | 365 | 5.3 MB | SOUTH OF KERMADEC ISLANDS | QED |
| 2008, Mar. 28 16:35:56 | 6.671 | −73.004 | 149 | 5.1 MB | NORTHERN COLOMBIA | QED |
| 2008, Mar. 28 18:43:39 | −14.873 | 167.259 | 121 | 4.6 MB | VANUATU ISLANDS | QED |
| 2008, Mar. 28 20:00:11 | 46.973 | 155.803 | 35 | 4.6 MB | EAST OF KURIL ISLANDS | QED |
| 2008, Mar. 28 22:41:32 | 20.237 | 121.869 | 10 | (null) (null) | PHILIPPINE ISLANDS REGION | QED |
| 2008, Mar. 28 23:03:23 | 39.596 | 141.956 | 74 | 4.6 MB | EASTERN HONSHU, JAPAN | QED |
| 2008, Mar. 28 23:04:55 | −17.861 | 168.413 | 156 | 5.0 MB | VANUATU ISLANDS | QED |
| 2008, Mar. 29 00:59:14 | 43.399 | −126.854 | 10 | 4.2 MB | OFF COAST OF OREGON | QED |
| 2008, Mar. 29 01:34:35 | −43.099 | −74.088 | 27 | 4.8 MB | SOUTHERN CHILE | QED |

TABLE 2-continued

Type Of Search

| Date | Latitude | Longitude | Depth (Km) | Magnitude | Location | Engine Used |
|---|---|---|---|---|---|---|
| 2008, Mar. 29 01:53:36 | 1.076 | 126.3 | 4 | 5.4 MB | NORTHERN MOLUCCA SEA | QED |
| 2008, Mar. 29 02:23:07 | .666 | 126.836 | 10 | 5.0 MB | NORTHERN MOLUCCA SEA | QED |
| 2008, Mar. 29 03:01:34 | 13.259 | 125.646 | 36 | 5.8 MB | PHILIPPINE ISLANDS REGION | QED |
| 2008, Mar. 29 05:43:44 | 18.921 | −66.781 | 7 | 2.8 MD | PUERTO RICO REGION | QED |
| 2008, Mar. 29 06:41:01 | −11.418 | −77.134 | 61 | 4.4 MB | NEAR COAST OF PERU | QED |
| 2008, Mar. 29 06:45:50 | 19.191 | −64.819 | 19 | 3.2 MD | VIRGIN ISLANDS | QED |
| 2008, Mar. 29 07:06:35 | 15.157 | −95.738 | 8 | 3.9 MD | NEAR COAST OF OAXACA, MEXI | QED |
| 2008, Mar. 29 08:09:46 | 20.229 | 121.948 | 13 | 5.5 MB | PHILIPPINE ISLANDS REGION | QED |
| 2008, Mar. 29 08:33:32 | 15.568 | −97.598 | 11 | 3.9 MD | NEAR COAST OF OAXACA, MEXI | QED |
| 2008, Mar. 29 12:51:25 | −12.127 | −77.135 | 51 | 5.4 MB | NEAR COAST OF PERU | QED |
| 2008, Mar. 29 17:30:49 | 2.882 | 95.265 | 20 | 5.9 MB | OFF W COAST OF NORTHERN SU | QED |
| 2008, Mar. 29 18:27:06 | 32.369 | −115.266 | 6 | 2.8 ML | CALIF.-BAJA CALIF. BORDER | QED |
| 2008, Mar. 29 19:34:59 | 15.364 | −92.823 | 94 | 4.3 MB | MEXICO-GUATEMALA BORDER RE | QED |
| 2008, Mar. 29 19:50:23 | 2.783 | 95.343 | 40 | 4.7 MB | OFF W COAST OF NORTHERN SU | QED |
| 2008, Mar. 29 21:08:25 | 54.571 | −161.637 | 48 | 5.0 MB | ALASKA PENINSULA | QED |
| 2008, Mar. 29 21:48:54 | −17.158 | −174.652 | 192 | 4.5 MB | TONGA ISLANDS | QED |
| 2008, Mar. 30 00:55:23 | 16.866 | −85.772 | 10 | 4.2 MB | NORTH OF HONDURAS | QED |
| 2008, Mar. 30 05:01:12 | 33.668 | 137.124 | 342 | 4.3 MB | NEAR S. COAST OF HONSHU, J | QED |
| 2008, Mar. 30 05:39:30 | 49.802 | 154.237 | 162 | 4.6 MB | KURIL ISLANDS | QED |
| 2008, Mar. 30 08:32:27 | 37.887 | 101.899 | 10 | 5.1 MB | QINGHAI, CHINA | QED |

Thus, as part of step 23, seismometer data from step 22 is examined, and likely earthquake events are identified. Time segments from the seismometer records corresponding to these selected seismic events are collected, and in some embodiments of the invention, the remainder of the passive data, which would include microearthquake data, is ignored. An earthquake catalog is then searched to identify the specific earthquake corresponding to each selected data segment. Source information, particularly geographical location, depth, and time, may be obtained from the earthquake catalog or similar source as explained above. Alternatively, standard source location techniques can be used to locate or relocate events that occur by studying the arrival times at permanent seismic stations that continuously record seismic data around the world. Source location is not required if the interferometric and/or other ambient noise techniques are used to process the passive seismic data.

Figure 2:
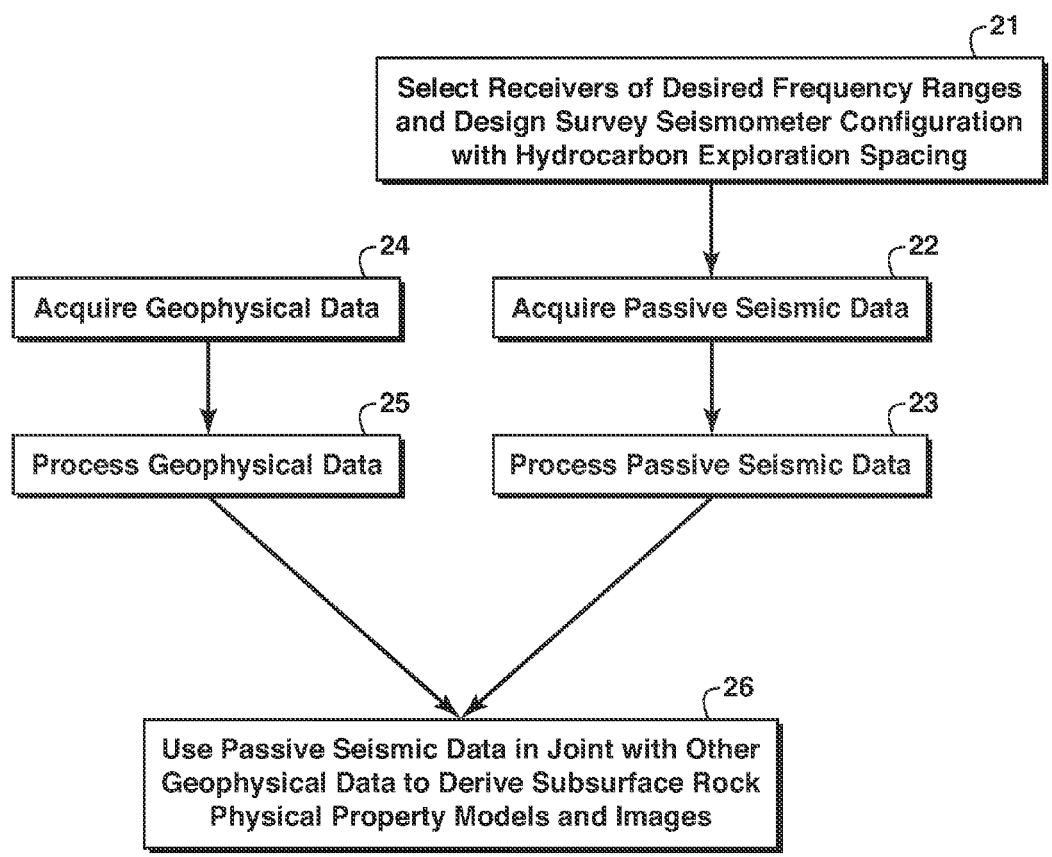
FIG. 2 is a flow chart showing the use of passive seismic and other geophysical data to derive subsurface rock physical property models for hydrocarbon exploration.

After such preliminary processing, the passive data are processed simultaneously (step 26) with other geophysical data (such as active seismic reflection data, gravity, magnetic, CSEM, MT. etc.) to achieve a better answer than would be obtained by inverting any of the individual geophysical data types alone. (FIG. 2 shows acquisition of at least one other type of geophysical data from the same subsurface region (step 24), and preliminary processing of such data (step 25), both of which the skilled artisan will be able to do by known methods.) Simultaneous processing means deriving information from two or more sets of geophysical data by setting up a system of equations and solving them either as a single, mathematical optimization problem or by sequentially solving each equation by alternating which parameters are fixed and which are solved for.

For example, the simultaneous processing of step 26 may be joint inversion. Inversion as defined herein means an automated procedure for obtaining an earth model that is consistent with the measured data and is typically implemented as an optimization problem in which the mismatch between measured and forward synthesized data is minimized. In manual forward-modeling iterative approaches, the user updates the model to reduce the mismatch between predicted and measured data. Such manual forward-modeling, performed simultaneously on passive seismic data plus at least one other data type, is an alternative way to perform step 26. Inversion techniques for individual data types have been used by the oil industry for many years. They are commonly used to derive subsurface rock properties from active seismic reflection data (Jin, et. al., "Shear-Wave Velocity and Density Estimation from PS-Wave AVO Analysis: Application to an OBC Data Set from North Sea", *Geophysics,* 65, 1446-1454 (2000)) and to estimate subsurface electrical conductivity from electromagnetic data (Carazzone, et al., *SEG Expanded Abstract* 24, P575 (2005); G. A. Newman and D. L. Alumbaugh, "Three-Dimensional Massively Parallel Electromagnetic Inversion—I. Theory," *Geophys. J. Int.,* 128, 345-354 (1997)). Joint inversion of multiple data is a relatively new concept in the oil industry, but common in global seismology where different types of seismic waves are often analyzed together (i.e., body waves and surface waves). In joint inversion, ideally the data misfits for multiple data types are simultaneously optimized using hypothesized relations between the relevant physical properties such as P-wave velocity and conductivity. Any missing information content in one geophysical data used by the inversion can potentially be filled with information from a distinct geophysical data type in order to reduce the uncertainty in the rock property models that are predicted.

Standard methods for integrating multiple geophysical data typically rely on human-directed interpretation processes, in which a person develops a hypothesis of the earth structure based on one of the data types (generally the seismic reflection data) and then determines whether structures inferred from the other geophysical data (e.g., gravity, CSEM, MT, etc.) are consistent with that initial guess. A manual iteration between the various data types ensues until a compromise of some sort has been reached. This sort of approach is extremely time-intensive and becomes increasingly difficult to carry out as additional data types are considered. In practice, two data types at most are compared (e.g., seismic and CSEM), just a few models are considered, and much of the available information contained within just those two data types (e.g., phase, AVO, effects, off-line effects, etc.) are simply ignored. If a third data type is available (e.g., gravity) it will typically be compared to just one of the other available data types (e.g., seismic) and the final model that is produced by iterating between those two may bear little relation to the final model that is produced by iterating between the seismic and CSEM data. Thus, inversion is preferred over manual forward-modeling, although as stated previously the present inventive method includes simultaneous manual forward modeling of passive seismic and at least one other data type in step 26.

Strack et al. describe schematically a type of joint inversion of time domain controlled source electromagnetic data with (active-source) seismic data in U.S. Pat. No. 7,328,107. No examples or test results are presented. In Patent Application Publication US 2007/0294036, Strack and Allegar disclose a method for acquiring and interpreting electroseismic and seismoelectric data in which joint inversion of the two data types is proposed. Joint inversion with electromagnetic data is also proposed. No test results are presented. Nothing in the way of a joint inversion algorithm is disclosed in the preceding papers, but in their paper "Joint Inversion of MT, Gravity and Seismic Data Applied to Sub-Basalt Imaging" (*SEG New Orleans* 2006 *Annual Meeting*), Heincke, Jegen and Hobbs disclose a joint inversion algorithm said to be capable of inverting gravity, seismic refraction and MT data to one common earth model. Their objective was hydrocarbon exploration below basalt formations.

As mentioned previously, Wagner et al. describe joint inversion of active and passive seismic data in Central Java in *Geophys. J. Int.* 170, 923-932 (2007). Their objective is better resolution of the upper crust rather than hydrocarbon exploration. They present an inversion algorithm and test data. Because the passive data were comprised solely of small, local earthquakes near to the area of interest, the earthquake times and locations were unknown. Therefore, they had to be inferred during the inversion process which introduced velocity errors because of trade-off between the velocities and source locations. Because the locations and times of the active data were known, the addition of those traveltimes to the passive traveltime inversion helped reduce this trade-off and therefore improved the crustal velocity estimates. In contrast, the present inventive method uses larger earthquakes whose locations are known (contained in earthquake catalogs) so that the trade-off referred to above is not an issue. In the present invention, the joint inversion of active and passive seismic datasets is used for an entirely different purpose, i.e. to help reduce the frequency gap that plagues active seismic inversions, as reflected by the requirement for earthquakes that fill the 0-8 hz frequency range.

Joint inversion of electromagnetic and seismic data is described in Hou et al., "Reservoir-Parameter Identification Using Minimum Relative Entropy-Based Bayesian Inversion of Seismic AVA and Marine CSEM Data," *Geophysics* 71, O77-O88 (2006); and Chen and Dickens, "Effects of Uncertainty in Rock-Physics Models on Reservoir Parameter Estimation Using Marine Seismic AVA and CSEM Data," Abstracts of the 77th Annual Meeting, *Society of Exploration Geophysicists*, 457-461 (2007). See also Jupp and Vozoff, "Resolving Anisotropy in Layered Media by Joint Inversion," *Geophysical Prospecting* 25, 460-470 (1977).

Figure 3:
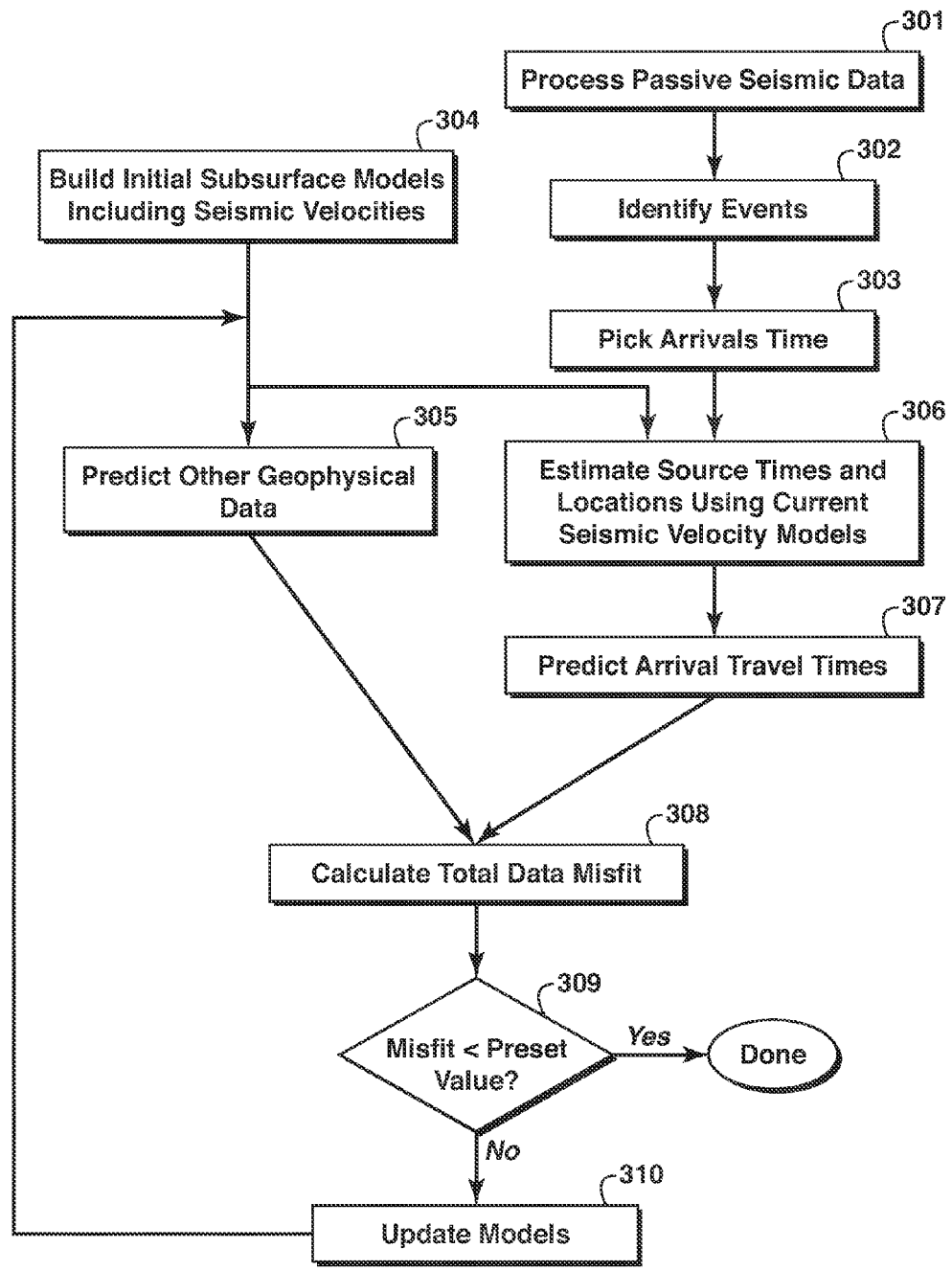
FIG. 3 shows a flow chart of the joint-inversion implementation of the invention in which a traveltime tomography analysis of the passive seismic data is combined with information from other type(s) of geophysical data.

The passive seismic data can be used jointly with other data types (step 26) in a number of ways. FIG. 3 shows a flow chart in which the travel time information from the passive seismic data is used in a joint-inversion implementation of the invention through travel time tomography. At step 301, the passive seismic data are processed. At step 302, desired arrivals are identified. At step 303, the arrival times for the identified arrivals are picked. At step 304, the initial subsurface models, including the seismic velocity model(s), and models for other parameters (e.g. conductivity) whose values affect the remaining data types, are built. At step 305, other geophysical data used in the joint inversion are predicted using the initial models. At step 306, the locations and times of occurrence for the sources in the passive seismic data are estimated using the initial seismic velocity model(s). At step 307, the arrival travel times of those sources in step 306 are predicted based on the current seismic velocity model(s). At step 308, the total data misfit between the predicted and the measured geophysical data is calculated. The data misfit for the passive seismic is a measure of the travel time difference between the arrival times computed based on the current velocity model(s) and the picked travel times from the passive seismic data. At step 309, the total data misfit is compared against a preset value. If the total data misfit is less than the preset value (or other stopping condition is reached), the inversion process is stopped, and the current subsurface model(s) is the final result of the inversion. If the total data misfit is greater than the preset value, the subsurface models are updated at step 310, and the inversion process returns to steps 305 and 306 for another cycle. This implementation of joint inversion using passive data is preferred when the passive seismic signals come from earthquakes, in which the desired seismic mode arrivals can be picked.

Figure 4:
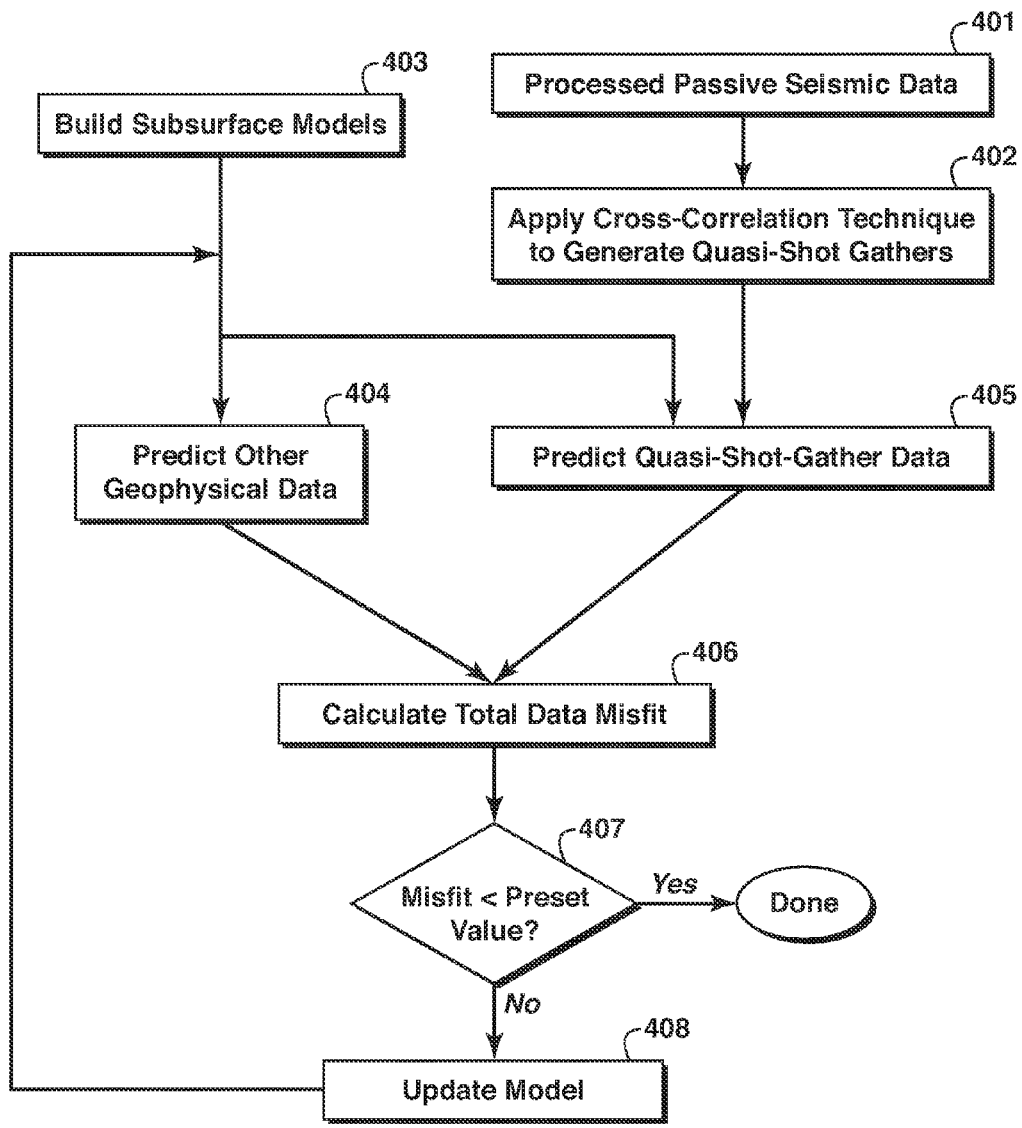
FIG. 4 shows a flow chart of the joint-inversion implementation of the invention in which reflection seismic data generated from the passive seismic data by cross-correlation are inverted jointly other type(s) of geophysical data.
Figure 5:
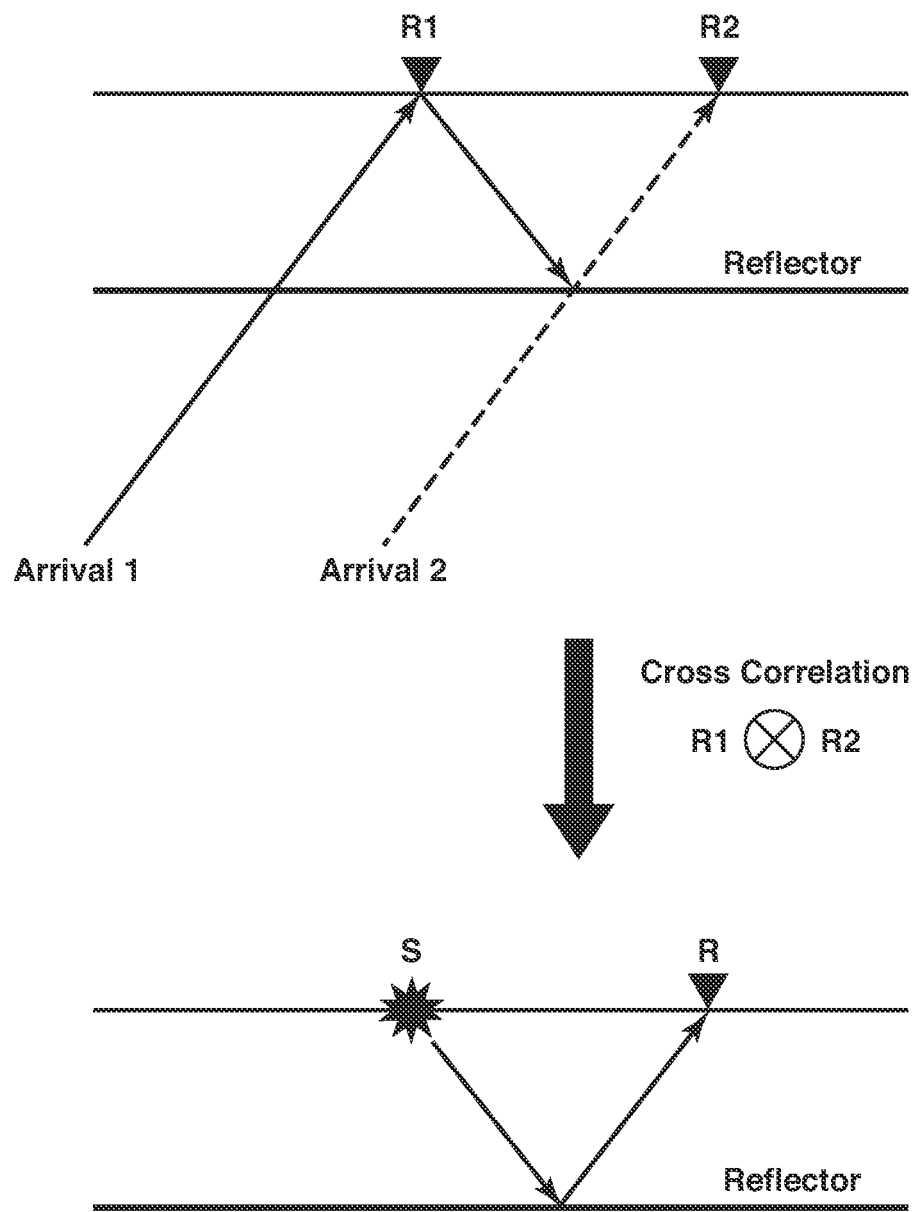
FIG. 5 is a schematic illustration of the method of synthesizing reflection seismic data from the passive seismic data using the cross-correlation technique.

FIG. 4 is a flow chart showing another implementation of the invention involving joint inversion using passive seismic data in step 26. In this implementation of the invention, cross-correlation (see Claerbout (1968) op. cit. or Wapenaar (2004) op. cit.) of the passive seismic data records is used to generate reflection seismic data. At step 401, the passive seismic data are processed. At step 402, the cross-correlation technique is applied to the passive seismic data to generate quasi-shot gathers. Either passive noise (Artman, op. cit. (2006)) or distinct earthquake arrivals from a distant source (Shragge et al., "Teleseismic Shot-Profile Migration," *Geophysics* 71, SI221-SI229 (2006)) can be processed to create traces comprising reflections from the local subsurface interfaces. Cross correlation of the data from pairs of receivers removes the direct arrival and creates a trace composed of reflections. This process is schematically illustrated in FIG. 5 for the case of one pair of receivers. The cross correlation of the two receivers, R1 and R2, effectively represents the reflected signal traveling from a virtual source located at receiver R1 to a subsurface reflector and back to the receiver located at R2. Using data obtained over a long listening time can effectively remove random noise and leave only the coherent arrivals caused by actual reflection events. This method converts the passive data into a number of "quasi-shot gathers," where each receiver location becomes an effective "shot."

At step 403, the initial subsurface models, including the seismic velocity model(s), are built. At step 404, the geophysical data other than the passive seismic data to be used in the joint inversion are predicted using the initial models. At step 405, passive seismic data corresponding to the quasi-shot gathers from step 402 are predicted using the current velocity model(s). At step 406, the total data misfit between the predicted and the measured geophysical data is calculated. At step 407, the total data misfit is compared against a preset value. If the total data misfit is less than the preset value (or other stopping condition is reached), the inversion process is stopped, and the current subsurface models are the final result of the inversion. If the total data misfit is greater than the preset value, the subsurface models are updated at step 408, and the inversion process repeats beginning with steps 404 and 405.

A joint inversion technique that may be used in preferred embodiments of the present invention as part of step 26 will be described in more detail next. However, it is important to understand that any joint inversion technique may be used in the present invention to invert earthquake data simultaneously with one or more other types of geophysical data as in step 26.

Joint Inversion

Figure 6:
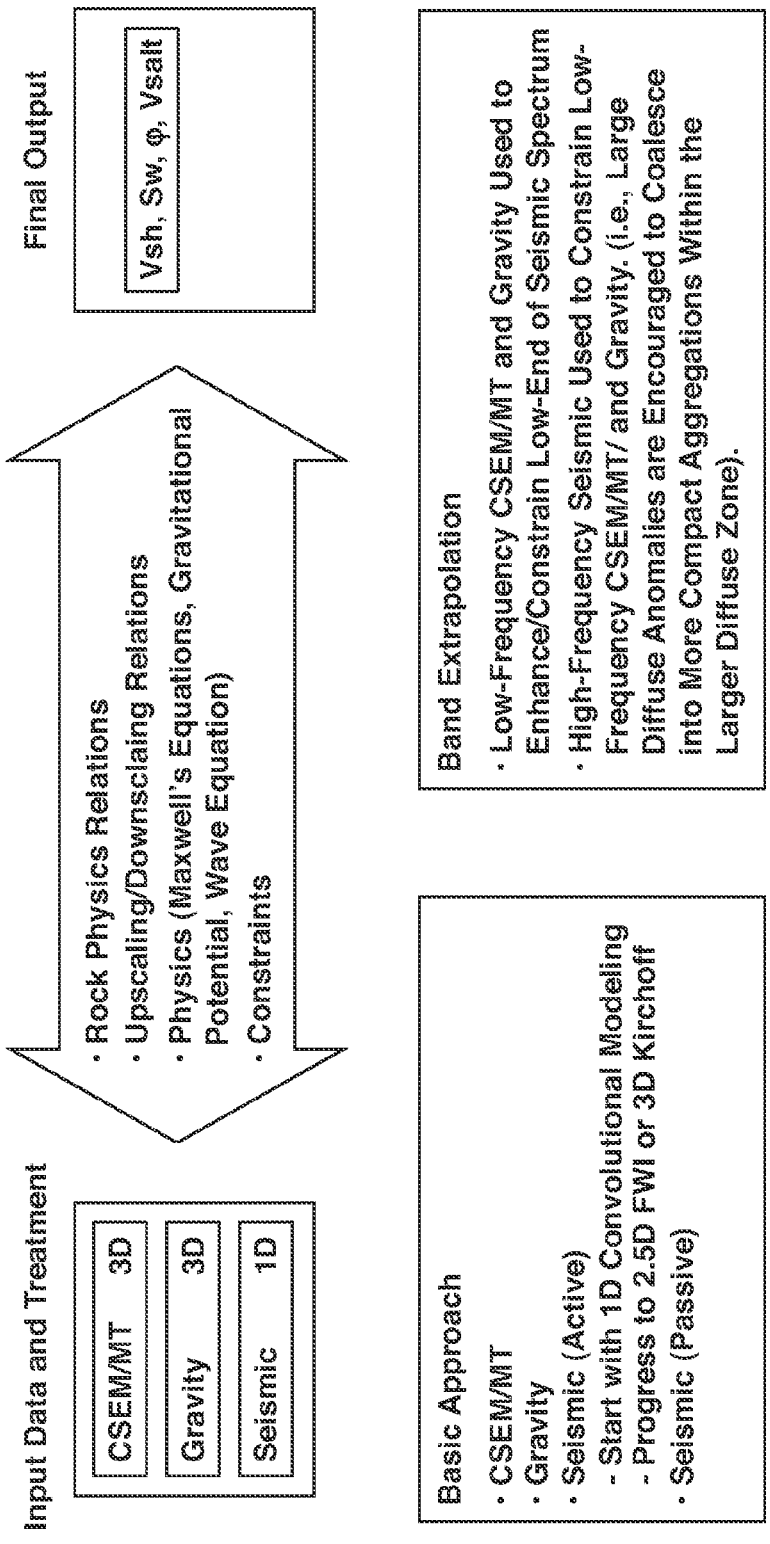
FIG. 6 is a schematic diagram showing a problem layout for joint inversion.
Figure 7:
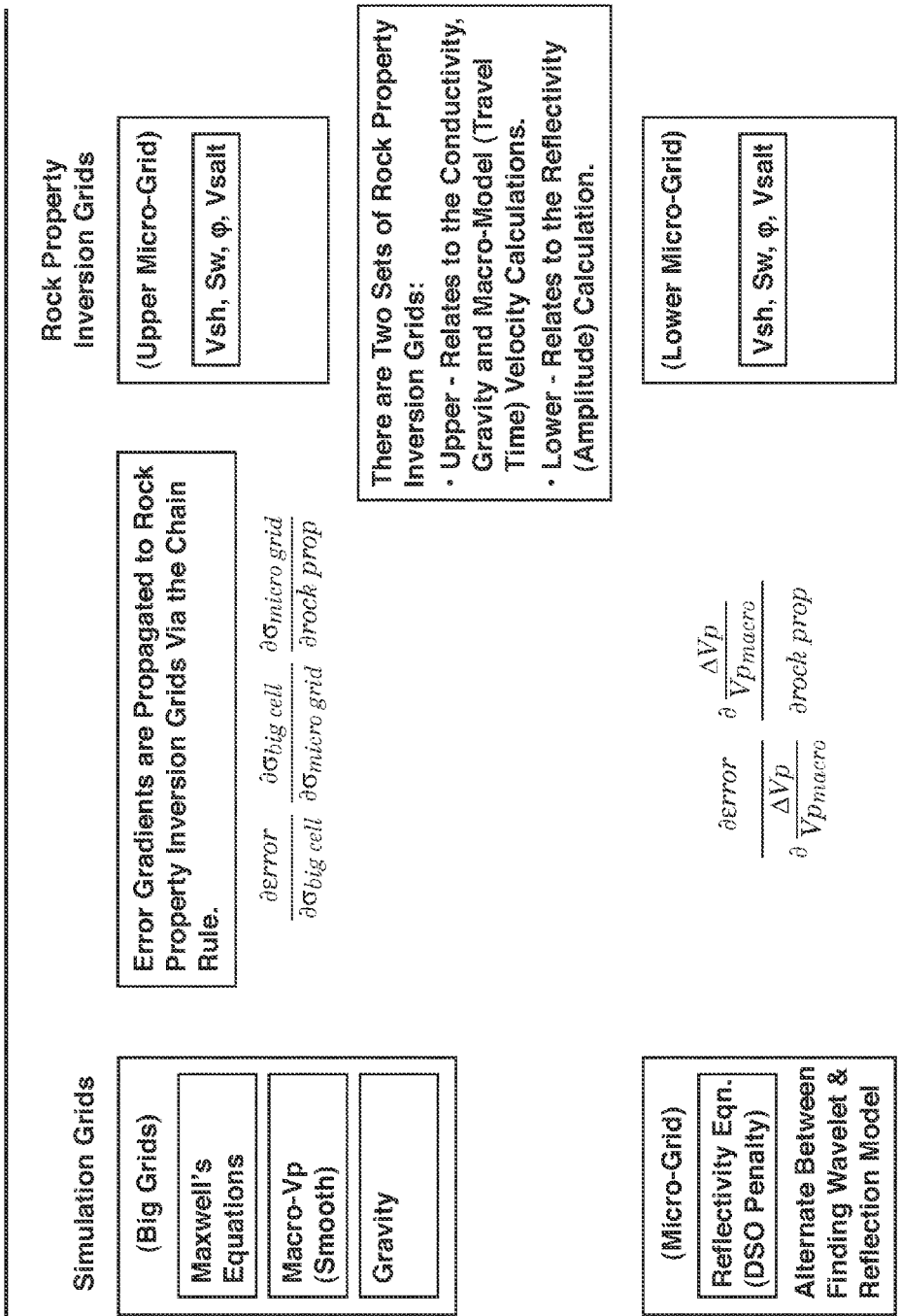
FIG. 7 is a schematic diagram illustrating how joint inversion computational grids may be updated using gradients.

The advantages of the joint inversion technique described herein are not limited to instances where earthquake data are one type of data being jointly inverted, although that application is central to this patent application. For example, one may wish to utilize both the high and low-frequency portions of the active source seismic data in a joint inversion with Earthquake/CSEM/MT/gravity and/or other geophysical measurements. A fundamental aspect of the present joint inversion technique is the recognition that rocks are systems of grains and pores (dry or fluid filled) contained within a matrix. This system links the physical properties of those rocks (e.g., velocity, resistivity, and density) to their structural composite properties (e.g., porosity, lithology, and water/hydrocarbon saturation). This linkage provides a means to complement information missing from one set of measurements (i.e., active source seismic) with information from another set of measurements (i.e., in particular the CSEM/MT/Gravity). It also provides a means for constructing the medium averages for grid transformations that are required in efficient finite difference computations. One embodiment of the present inventive joint inversion technique will be described next. FIGS. 6 and 7 are schematic diagrams that summarize the following discussion of an inventive joint inversion engine.

Joint inversion of these different data types can be accomplished by the use of non-linear gradient techniques or a hybrid scheme involving the use of gradient-based as well as derivative free methods (Audet, et al., "Mesh Adaptive Direct Search Algorithms for Constrained Optimization," *SIAM Journal on Optimization*, 17, 188-217 (2006)). A generic inverse problem can be formulated as the minimization of the error functional ($\psi$) which contains a data error term and one or more damping and/or smoothing terms and additional constraints:

$$\psi = \frac{1}{2}\{D(d^{obs} - d^{pred})\}^T\{D(d^{obs} - d^{pred})\} + \frac{1}{2}\lambda\{Wm\}^T\{Wm\} \quad (1)$$

where m is the model vector, $d^{obs}$ are the data measurements, D is a weighting matrix that weights those measurements, $d^{pred}$ are the data values predicted using the model, $d^{obs}$ are the observed data, W is a smoothing (or damping) matrix that reduces model curvature (or size of perturbations) in three dimensions, $\lambda$ is a scaling parameter that balances the model smoothness/roughness against the data error, and T denotes matrix transpose. In the case of joint inversion, an error functional such as described by Equation (1) can be defined for each data type separately, followed by a multi-objective formulation of the joint inversion problem. Multi-objective optimization tools provide the capability to solve problems where several objective functions are optimized simultaneously (Steuer, "Multiple Criteria Optimization, Theory, Computations and Applications," John Wiley & Sons (1986); Das, et al., "Normal-Boundary Intersection: A New Method for Generating the Pareto Surface in Nonlinear Multicriteria Optimization Problems," *SIAM Journal on Optimization* 8, 631-657 (1998)). The total joint error functional can be defined as a vector functional:

$$\psi^{total} = [\psi_1(m)\psi_2(m) \ldots \psi_n(m)]^T \quad (2)$$

where n is the number of data types involved in the joint inversion formulation. Possible approaches to solve such a problem include minimizing a weighted linear or nonlinear combination of the components of the vector function, or minimizing any one component and constraining the remaining to be within certain limits. The latter approach makes the inverse problem a constrained optimization problem, where the constraints define a set or sets of combinations of model parameters that are allowed in the inversion search space. Other constraints on the model parameters can be imposed to ensure that the inversion results are physically meaningful, or could be mathematical in nature—to make the inversion numerically stable.

The model parameters are the lithology (e.g., shale volume content in a clastic rock or dolomite or Calcium Carbonate content in a carbonate rock), the water saturation of the pore fluid (Sw), the porosity ($\phi$), and a second lithology parameter if required ($V_{lith}$), respectively, are defined on a fine scale grid. Rock physics equations are used to transform the model properties into the physical properties of conductivity ($\vec{\sigma}$), elastic moduli ($\overline{\overline{C}}_{ijkl}$) and density ($\rho$), which are then used to solve Maxwell's equations, the elastic (or acoustic) wave equation or the Kirchhoff equation as a high-frequency approximation, and the gravitational potential equation. A range of approximate relationships have been developed to link the rock formation and/or reservoir properties to rock physical properties, such as elastic and electrical properties. (Xu, et al., "A New Velocity Model for Clay-Sand Mixtures," *Geophysical Prospecting* 43, 91-118 (1995); Archie, "The Electrical Resistivity Log as an Aid in Determining Some Reservoir Characteristics," *Transactions of the AIME* 146, 54-62 (1942). PCT International Patent Application No. US2008/075920, inventors Deffenbaugh et al., discloses a method for determining relationships for use in hydrocarbon exploration among seismic, electrical, and reservoir properties of a subsurface rock formation. The method allows these relationships to be determined using as few as one rock sample. The forward problem is solved on a staggered finite difference grid. To speed up the computation, the physical properties are up-scaled onto larger grids according to the frequency of the corresponding data.

The difference between the predicted data $d^{pred}$ and the observed data $d^{obs}$ from each of the data types form the error term in the error functional of Equation (1). These errors are propagated back to the rock property micro-grid via the medium average algorithm and the chain rule (to downscale from the larger grids used by the forward simulation to the smaller grids):

$$\frac{\partial \psi}{\partial \text{rock prop}} = \frac{\partial \text{error}}{\partial \text{macro}}\frac{\partial \text{macro}}{\partial \text{micro}}\frac{\partial \text{micro}}{\partial \text{rock prop}} + \frac{\partial \text{smoothing part}}{\partial \text{rockprop}} \quad (3)$$

It includes the gradient in the data fitting error and the smoothing part for one of the physical properties ($\vec{\sigma}, \overline{\overline{C}}_{ijkl}$, or $\rho$), and $$\frac{\partial \text{macro}}{\partial \text{micro}}$$

transforms the physical property from a macro- to a micro-grid, and $$\frac{\partial \text{micro}}{\partial \text{rock prop}}$$

computes the derivative with respect to one of the rock properties (Vsh, Sw, φ, or $V_{lith}$) using an appropriate rock physics model such as the Xu-White model (Xu and White, "A Physical Model for Shear-Wave Velocity Prediction," *Geophysical Prospecting* 44, 687-717 (1996).

Because the active source seismic data have three types of unknowns:
1. smooth background (macro-model) interval velocities (Vp, Vs etc);
2. variations of elastic properties within the spectrum of the source wavelet; and
3. source wavelet that are related in a highly nonlinear manner, there is some risk that errors in the wavelet scaling will cause nonlinear effects in subsequent travel time calculations that could ultimately de-stabilize the inversion. Therefore, in this embodiment of the invention, these two pieces are separated. The travel times are calculated on a coarse (smooth) grid. The elastic parameter variations which create the reflection amplitudes and wavelet are calculated on a finer-scale, grid.

A major issue with least-squares, pre-stack active source seismic inversion of "raw" gathers (data without velocity corrections) for macro-model interval velocities is getting trapped in multiple minima. This problem occurs if the initial model is too far off from the correct answer because the least-squares gradient contains no discernible energy at vertical spatial wavelengths longer than $V_0/2\,f_{min}$, where $V_0$ is the overburden seismic wave interval velocity and $f_{min}$ is the minimum wavelet frequency. To reduce the multiple-minima problem, two strategies can be employed: (1) improve the starting model and (2) modify the optimization approach.

The quality of the starting model may be improved by jointly inverting Earthquake/CSEM/MT/Gravity information along with the low-frequency seismic travel time information (NMO velocities). The Earthquake/CSEM/MT/Gravity inversion produces macro-model P-wave and S-wave velocity volumes that rely on more than just the travel time information, but instead include information that is extracted from the non-seismic data (CSEM/MT/gravity) via the rock physics relations. To further reduce the multiple minima problem, various optimization techniques such as differential semblance optimization may be used. See, for example, Leeuwen and Mulder, "Data-Correlation for Velocity Inversion," *77th Annual International Meeting, SEG, Expanded Abstracts* 26, 1800-1804 (2007); and Symes and Carazzone, "Velocity Inversion by Differential Semblance Optimization," *Geophysics* 56, 654-663 (1991). This approach effectively relaxes the error function by adding a spatial variable that is then forced to disappear. However, an assumption of this method is that multiple reflections do not obscure the primary arrival time information. If multiples have not been adequately suppressed in the data, the method is less likely to be successful. Inversion of the better starting model with the seismic gathers will further adjust the macro-model interval seismic wave velocities to completely predict the primary move-out and recover the variations in the elastic parameters within the seismic pass band.

The active source seismic forward calculation may be performed as follows. First, the travel-times are computed via ray-tracing through the macro-model interval velocity model. Second, the offset-dependent reflectivity of the pre-stack seismic gathers are inverted to find the elastic parameter variations using a convolutional or other appropriate approximation. Third, the DSO penalty is applied in order to find the velocity model that flattens all data in the gathers. Fourth, the wavelet scaling parameter is updated (if there are multiples in the data that can be used to constrain this information). This set of computations form an inner loop within the larger framework of the joint inversion that can be repeated many times until convergence is attained.

The active source seismic piece has been separated into two pieces, i.e. the separation of dependence of seismic data non-linearly on the macromodel velocity information which controls traveltime information and dependence of the seismic data more or less linearly on the variations in elastic properties which control reflection amplitudes. Because of this separation, there are two separate error gradients to be computed and propagated to the rock physics grid. The first set relates to the macro-model Vp (or both Vp and Vs) parameter. It is derived from the travel-time part of the computation and is similar to the error gradients computed in equation 3 for the CSEM/MT/Gravity data fits. The second set of error gradients is with respect to the AVO piece:

$$\frac{\partial \psi}{\partial \text{rock prop}} = \frac{\partial \varepsilon rror}{\partial \frac{\Delta V_p}{V_{p_{macro}}}} \frac{\partial \frac{\Delta V_p}{V_{p_{macro}}}}{\partial \text{rock prop}} \quad (4)$$

Because the simulation grid for the AVO piece is on the same fine scale as the inversion grid, no up-scaling/down-scaling between these two is required.

In this embodiment of the invention, the amplitude information from the seismic is separated from the travel time piece of the seismic. The amplitude information is not included in the joint inversion objective function until after the low-frequency parts of the model have converged. Once the low-frequency components of the model have converged, the implied velocity model is fixed (for raytracing) and just the amplitude information from the seismic is inverted with the other datatypes (e.g., gravity, CSEM, MT, earthquake) until the solution for that modified set of datatypes has converged.

Reviewing the steps in the flow chart of FIG. 2 once more, step 21 involves design of a passive seismic monitoring survey, which is designed to fit the scale of hydrocarbon exploration. Previous typical passive source experiments have been targeted to the scale of the Earth's crust and mantle, with receiver spacing on the order of kilometers. A survey of the present invention targets the hydrocarbon exploration case, and the survey design will therefore not only take the shallower target into account, but also the sources and its associated azimuths and distances that can be expected. Although the receiver spacing will be that suitable for hydrocarbon prospecting, i.e. the same as might be used in active source seismic hydrocarbon surveys, the receivers must be earthquake seismometers or similar acoustic detectors with frequency response extending down to about 1 Hz instead of the typical hydrophone or geophone used in active source seismic work which have frequency response down to only 5-6 Hz.

At step 21, the types of seismometer(s) used for data acquisition are selected according to the frequency ranges of the passive seismic signals that need to be recorded. The frequency range is related to the source-receiver distance, i.e. generally events of larger distance between the event and the recording station have lower frequency content. Earthquakes occurring at teleseismic distances (angle subtended at the center of the Earth=30° to 90° from the recording station) contain the lowest frequency content, on the order of 1-3 Hz, regional events (distances less than 30° or ~3000 km), and local earthquakes (within 100 km of the recording station) produce signals of highest frequency content (since the high frequencies are not filtered out by a long propagation path), which can overlap with the active seismic frequency band.

Multiple seismometer types with different frequency response characteristics can be deployed to record the desired frequency bands. The receiver surface coverage area and spacing is preferably designed according to the frequency range and subsurface area to be covered. For example, receivers of low-frequency response may be placed more sparsely than those of high-frequency response. The required receiver spacing may be determined as a function of the maximum desired frequency, maximum dip of the arriving wavefront, and subsurface velocity, in a manner that is known to those familiar with the technical field of the active-source seismic data acquisition. For example, the receiver spacing is typically made proportional to the inverse of frequency. The receiver spacing for passive seismic acquisition (except for very local micro-earthquakes) is usually larger than the normal active seismic survey due to the lower frequency content of the passive seismic data one tries to acquire.

At step 22, this passive monitoring system is used, on a continuous or triggered basis, to record arrivals from all sources, such as earthquakes and man-made activities not intended as seismic sources. For example, in an offshore setting, an ocean bottom cable system or independent sensor packages with geophones capable of recording signals down to 0.5 Hz could be deployed for an extended time period in the survey area. In an onshore setting, a dense array of broadband receivers would be recording continuously or triggered over a predetermined period of time. A long continuous deployment time allows for recording of more data from more sources, providing a larger signal-to-noise ratio in the processed passive seismic data, whereas a triggering mechanism could be used to cause recording to begin only when an event is detected; reducing the amount of memory required to store the data.

At step 23, the data are processed to extract the signals from the continuous or triggered recording. The processing is according to the manner in which the passive seismic data are going to be used in step 26. Some embodiments of the invention use signals of all passive sources, i.e. natural and man-made not employed purposefully in a seismic acquisition program (such as sources from mining activities, etc.), all magnitudes (to as small as microseismicity), all distance ranges (including but not limited to local, regional, and teleseismic), and all wave types (body and surface waves). All these sources provide pieces of information, which together allow the frequency range to be expanded to a broad band between 0 Hz and 10 Hz. These isolated signals are used in conjunction with known processing techniques, such as traveltime tomography (including both body and surface wave tomography), finite-frequency tomography, ambient noise tomography, surface wave dispersion analysis, receiver-function analysis, interferometry, and partial or full waveform inversion.

At step 26, the extracted seismic signals may be used jointly with other type(s) of geophysical data to obtain subsurface structure and rock properties. Here, both passive seismic data and the additional geophysical data are jointly used to derive subsurface images and rock property models, either by using joint inversion techniques or by applying inversion and/or imaging methods on the individual datasets sequentially. Preferably, this step is implemented within a joint or simultaneous inversion, in which a subsurface model is obtained by minimizing the difference between the predicted and measured data. Alternative implementations are also possible. For example, one can derive the subsurface rock properties and/or structural image from the passive seismic data first, and then use the other geophysical data to refine the results. The geophysical data other than the passive seismic data can for example be either one of or a combination of active seismic data, CSEM, MT, gravity, magnetic, and well-log data.

For embodiments of the invention that include joint inversion as a processing step, the joint-inversion can be performed in either the time or frequency domain. Different aspects of the passive seismic data can be used with appropriate techniques in the joint inversion process. For example, the arrival times in the passive seismic data can be used to constrain, via travel time tomography, the subsurface seismic wave velocity model in the joint inversion; or reflection seismic data similar to active seismic data can be generated from the passive seismic data using the cross correlation technique (see Artman, op.cit. (2006)).

Similar to the joint inversion of passive seismic data and other type(s) of geophysical data as described above, other techniques can also be applied to the passive seismic data in such inversion. Some of the examples include: 1) the receiver function method (Shen et al., "Mantle Discontinuity Structure Beneath the Southern East Pacific Rise from P-to-S Converted Phases," *Science* 280, 1232-1235 (1998)), which uses the converted modes from some discontinuities to image the subsurface structure, and 2) using surface wave arrivals from earthquakes and their velocity dispersion characteristics to derive subsurface models. The dispersion of the surface wave velocity versus frequency provides depth resolution of the wave velocity in the subsurface. The surface wave velocity variation in the horizontal direction provides the lateral resolution. Use of the receiver function method in step 26 is discussed next.

Receiver Functions

The passive source, receiver function techniques (e.g., Langston and Phinney, op. cit.) will next be extended to the smaller scales of interest to hydrocarbon exploration. In addition to papers using receiver functions on passive seismic data, there is at least one publication on receiver functions calculated for a multi-component, active-source dataset. That reference is "Receiver Function Method in Reflection Seismology," Edme and Singh, *Geophysical Prospecting* 56, 327-340 (2008). The paper discusses the application of the receiver function technique on wide-angle multi-component active seismic data, in an attempt to highlight the P-to-S converted phases, which can then be used for amplitude vs. slowness or offset analysis. As previously stated, the present invention uses a survey design with a significantly smaller spacing between the receivers than is normally employed in global seismology. The increased density of receivers is designed to allow for target depths typical of hydrocarbon exploration to be resolved. A long deployment with continuous recording will usually be necessary and will supply data from events of all distance ranges, which will provide an increased signal-to-noise ratio in the processing and imaging of the passive source seismic data.

Figure 8:
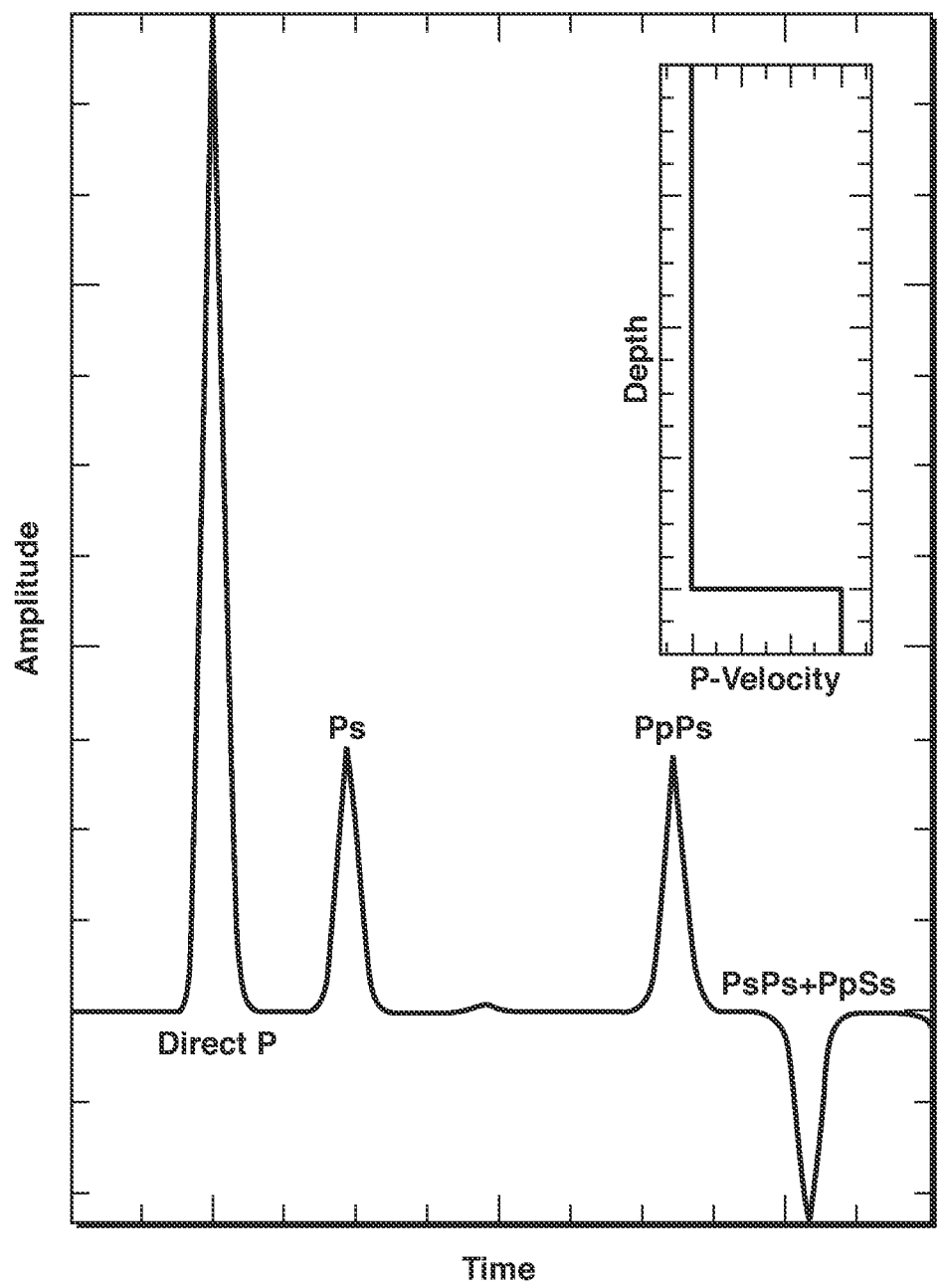
FIG. 8 shows a synthetic receiver function waveform as result of deconvolving the vertical component seismogram from a horizontal component seismogram for the simple velocity model shown in the inset.
Figure 9A:
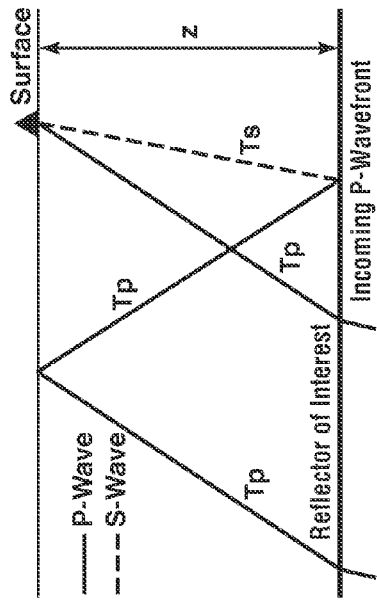
FIGS. 9A-D show schematic diagrams of typical seismic phases expected on receiver function waveforms.
Figure 9B:
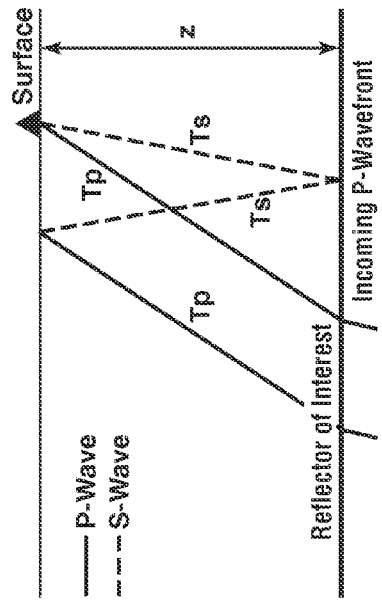
Figure 9C:
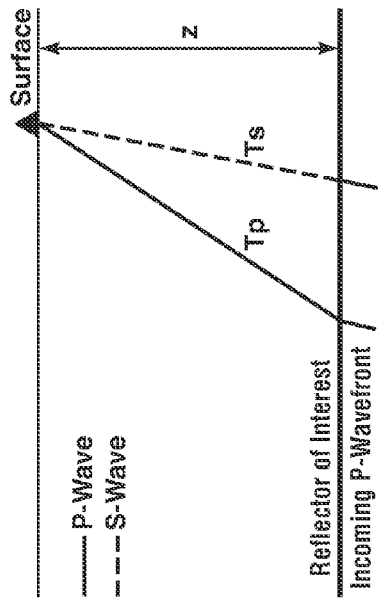
Figure 9D:
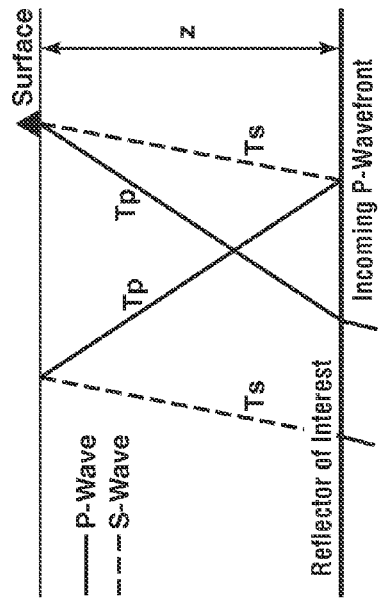

The receiver function technique removes the effects of source and propagation; its result is a waveform that reflects the medium in the vicinity of the recording station. Receiver functions are calculated by deconvolving (or cross-correlating) the vertical component seismogram from the horizontal component seismogram. Typically events in the teleseismic distance range are used for this frequency domain division, since the seismic rays arrive at the recording station at an angle close to vertical. The vertical component seismogram of a teleseismic event will have predominantly P-wave energy recorded, whereas the horizontal component seismogram includes both P- and S-wave energy. In the simplest cases the deconvolution removes the effects of the source-time function from the horizontal component seismogram, and thus highlights the otherwise masked converted S-wave energy. The resulting receiver function waveform (FIG. 8) contains information about the structure in the vicinity of the receiver. The expected seismic phases are the P-to-S converted phase, and its reverberations PpPs and PsPs+PpSs; however, the technique can also be modified to highlight S to P converted phases. FIGS. 9A-D show a simplified illustration of the seismic phases of the P-to-S converted phase (9A) and its reverberations (PpPs in 9B, PsPs in 9C, and PpSs in 9D) that can be expected from the receiver function analysis.

The differential arrival times that can be expected on the waveform (FIG. 8) are between the direct P-wave arrival and the S-converted phase at the reflector of interest (in the simplest case $\Delta t_{P_s} = t_s - t_P$), as well as its reverberations $\Delta t_{P_pP_s} = t_s + t_P$, and $\Delta t_{P_sP_s+P_pS_s} = 2\ t_s$. The differential arrival times can be used to construct the depth of the reflector of interest, and can be integrated with other geophysical datasets, such as active source seismic datasets, gravity, CSEM, MT, etc. If traveltime information from multicomponent active source datasets is available, the differential arrival times from the receiver function method can be used along with the active source dataset. In addition to using the traveltime information independently, use can be made of the amplitude information from the receiver functions, which can be accomplished by a full waveform inversion. In this approach, initial models of the earth and the source are assumed, which allows computation of initial data by solving the appropriate wave equation with a sufficiently broadband source spectrum. Furthermore, these initial models may be modified in an inversion algorithm which is adjusted for both the earth medium and source parameters. This procedure can be accomplished in either the time or frequency domain. The main advantage of an error function realization in the frequency domain is that specific missing frequency values or low signal-to-noise frequency values will not affect good data values as they would with an error function in the time domain.

In addition to the traditional way of calculating teleseismic receiver functions, the present inventive method can use events from the local and regional distance range for the deconvolution. The advantage of including these events in a closer vicinity to the recording station is the opportunity to increase the frequency band to a broad range of ~1 Hz up to frequencies comparable to these of active seismic exploration, and thus reduce the frequency gap 10 shown in FIG. 1 and discussed previously herein. The difficulty in adding these events is that the assumptions made for teleseismic receiver functions may not be valid any longer, since the deconvolution may not completely remove the effects of the source-time function. The present invention can deal with this problem by (1) calibrating the earth response with some man-made sources (such as mining activities or other active sources) which have simple or known source-time functions, and (2) pursuing a full waveform inversion approach, which will enable determination of the remaining source effects.

A waveform inversion receiver function technique suitable for use in the present inventive method will next be described in more detail.

The objective is a technique for recovering subsurface geophysical parameters such as P- and S-wave velocity, density, elastic anisotropy coefficients ($\epsilon$ and $\delta$), P- and S-wave attenuation quality factors, etc. based upon broadband measurements of multiple-component surface (or near surface) vector (i.e. three component), acoustic (or visco-acoustic) or elastic (or visco-elastic) displacement, velocity, as well as acceleration and surface (or near surface) elastic (or visco-elastic) tensor (i.e. nine component) stress (collectively called broadband multi-component earthquake data) and forming multi-channel ratios of the broadband multi-component earthquake data (in the spirit of receiver functions) to reduce the unknown effects of the broadband earthquake source, aspects of earth close to the detector, and some intrinsic aspects of the detection system itself as well. The resulting multi-channel ratios of the broadband multi-component earthquake data will obey equations that are obtained from the appropriate acoustic, elastic, visco-acoustic, visco-elastic, wave equations. The complexity of the specific equations selected will depend upon survey objectives, data coverage and many other factors. To be specific, models may be one, two, two and one-half or three dimensional and may involve acoustic, elastic or visco-elastic wave propagation and be isotropic, VTI or contain completely general twenty-one (complex) moduli plus density varying in all three dimensions. There are, however, at least four conditions that the multi-channel ratios of the broadband multi-component earthquake data preferably satisfy:

1) The approximation of a single earthquake source as responsible for all significant earthquake data components (at least within a predictable time window of suitable length) should be justified to a reasonable order of approximation for survey objectives.

2) The measurements should be sufficiently broadband i.e. the measurements should contain useful signal content down to very small frequencies and be without significant gaps up to some maximum frequency of interest.

3) The single earthquake source within each time window should be sufficiently distant from the observations to justify treating the earthquake source as well localized in three dimensional space so that the surviving earthquake source dependence in the multi-channel ratios may be effectively parameterized with a modest number of unknown parameters (such as three-dimensional location, orientation, residual source-time function, radiation pattern, tensor couple, etc).

4) The number, quality, vector or tensor component and spatial distribution of the complete set of useful observations should effectively enable determination of both the medium properties to the level desired and the surviving unknown parameters describing the earthquake source dependence in the multi-channel ratios. Clearly ratio data from a single distant earthquake source will determine at best only certain averages of the earth volume between the earthquake source and the observation points along the paths taken by P-waves in the acoustic approximation, or P-wave and S-wave rays in the elastic or visco-elastic approximation or the qP-wave, qSV-wave and qSH-wave (quasi Compressional wave, quasi Shear Vertical wave and quasi Shear Horizontal wave in the one dimensional VTI model, etc. Notice also that information will also in principle be obtained along ray paths created by P to S conversions etc., reflections and multiple reflections provided that the data analysis is capable of including the relevant physics.

Data analysis or inversion in this embodiment of the present invention then involves a least-squares inversion based upon an error or objective function (including possible smoothing and penalty terms) that contains the weighted and squared difference between measured and computed ratios constructed from suitably time windowed real and computed data. Advantages of a frequency domain expression of the error function have been mentioned: frequency domain error functions are more robust in the presence of missing frequencies. Again the time windowing process is preferred to ensure that only one significant earthquake (or other passive) source is responsible for a significant portion of the events observed in the windowed data. As the earthquake data is assumed to be broadband, convergence of the least-squares gradient-based family of algorithms to false local minima is not foreseen as a problem (unlike the active-source reflection seismic inversion problem which unavoidedly suffers from contamination with local false minima in the absence of a nearly perfect initial velocity model). Computationally, an initial earth model and an initial source model are assumed, and initial data are computed using a sufficiently broadband source spectrum with arbitrary amplitude using finite difference or other methods in the time or frequency domain as required by the selected numerical approach. In addition, derivatives of the computed data are obtained in order to allow the inversion algorithm to adjust both earth medium parameters (velocities, densities etc) and earthquake source parameters to decrease the initial fit error. The method of alternation between earth medium and earthquake source parameters, widely employed in gradient-based optimization methods with non-homogeneous parameters may be employed. One alternative is the sub-space iteration method which groups inversion unknowns into physically non-heterogeneous classes to avoid the pitfalls of stiff optimization in which variables of vastly different numerical scale appear in the normal equations. The iterative inversion procedure continues adjusting medium and source parameters until a satisfactory fit to the measured and windowed data is achieved. Subsequent model testing can be used to help determine well constrained versus poorly constrained parameters.

Receiver function results obtained either via an inversion method such as is described above or by the standard approach of manual iterative forward modeling can then be used to create a low-frequency or background model for AVO inversion of active source seismic reflection data in order to obtain estimates of P and S-impedance or even rock properties such as the porosity, lithology and fluid content of subsurface rocks (e.g., Saltzer, *Leading Edge* 24, 732-736 (2005)). Alternatively, the scattered wave results can be used to improve the velocity model used for depth migration of active source seismic reflection data. Lastly, the passively recorded seismic data can be jointly inverted with other geophysical data such as active source seismic reflection data, CSEM, MT, gravity and gravity gradiometry, in order to obtain more robust estimates of elastic and/or rock properties.

Figure 10A:
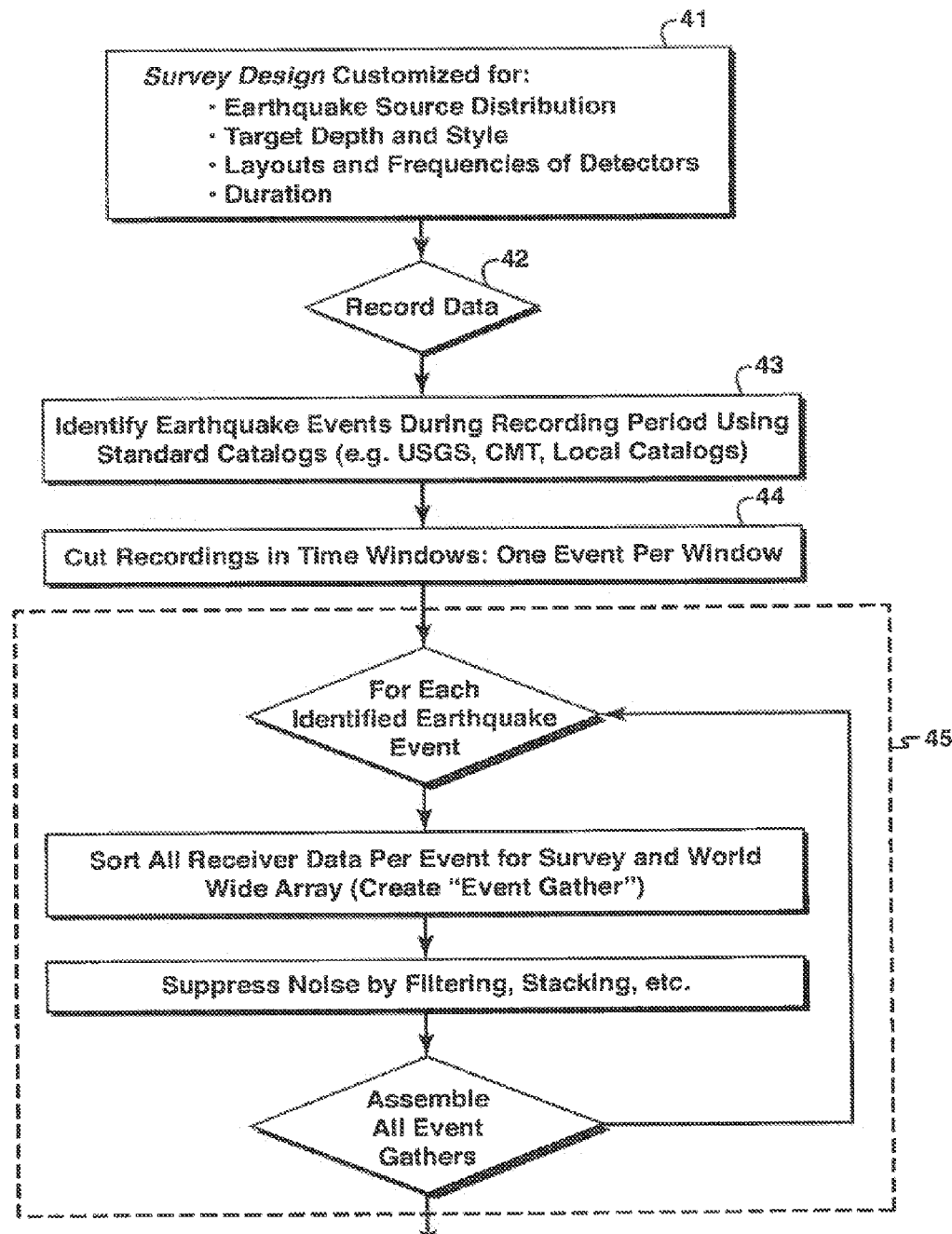
FIGS. 10A and 10B combine to form a flow chart, referred to hereinafter as FIG. 10, showing basic steps in one embodiment of the present inventive method.
Figure 10B:
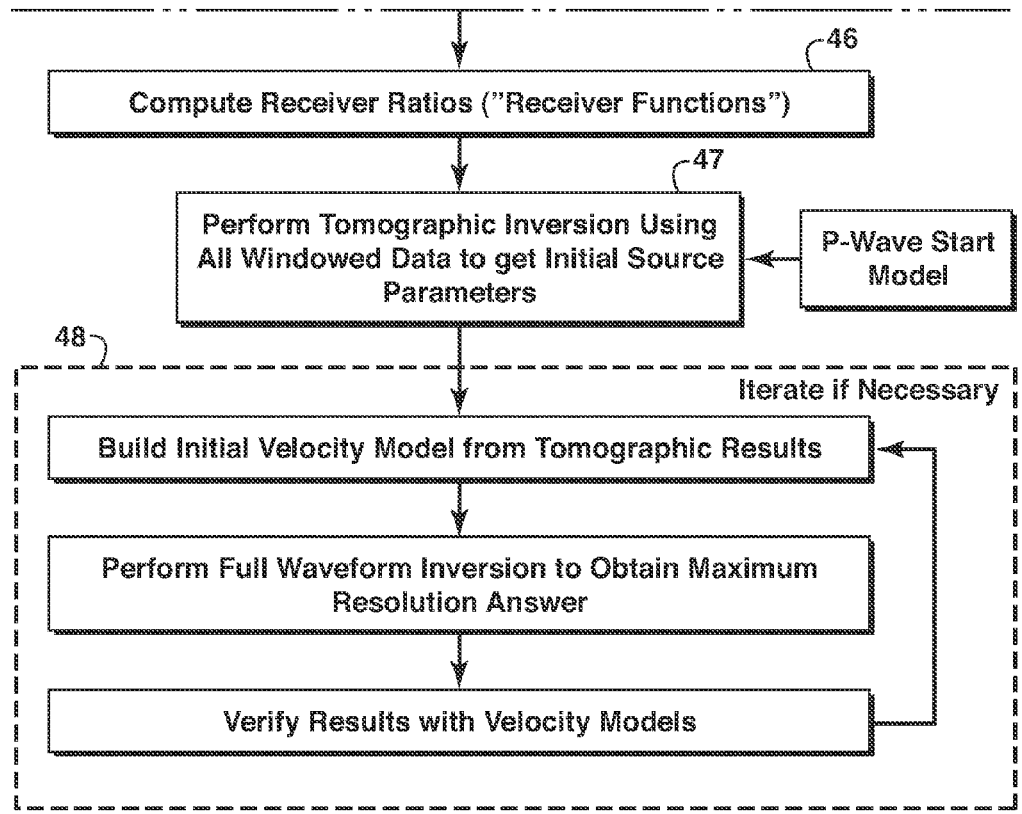

Basic steps of an example embodiment of the present invention using a preferred receiver function technique are illustrated in the flow chart of FIG. 10. At step 41, the survey is designed for objectives appropriate to the hydrocarbon targets. This takes into account (1) the expected earthquake source distribution, (2) target depth and structural style to determine survey duration, layout, detector spacing and other aspects. At step 42 the data are recorded, and at step 43 event information is gathered from standard catalogs such as CMT, USGS or independent relocation (source time and location in three dimensional space) of local/regional events (e.g. Waldhauser and Ellsworth, "A Double-Difference Earthquake Location Algorithm: Method and Application to the Northern Hayward Fault," *Bull. Seism. Soc. Am.* 90, 1353-1368 (2000)). At step 44, the event information gathered from the prior step is used to cut the recordings into time windows, with one event per window. For each event identified, all receiver data are collected and an "event gather" is created, and noise is suppressed by filtering and stacking (step 45). All event gathers are collected, and at step 46 receiver ratios ("receiver functions") are calculated. A tomographic inversion is calculated (step 47) using the receiver functions, which has to include a P-wave starting model, determined from another data source (such as an active seismic source experiment). At step 48, an initial velocity model is constructed based on the tomographic inversion and possibly other data, and a full waveform inversion for the initial model and source parameters is performed until the maximum resolution answer is achieved, i.e. until the inversion bandwidth is extended to an upper frequency limit that is high enough to be deemed acceptable. The results are verified for geologic reasonableness, and step 48 is iterated as needed, after adjusting the velocity model and/or the source parameters.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A method for hydrocarbon detection in a subsurface region using passive-source seismic data in conjunction with at least one other type of geophysical data, comprising:
 (a) obtaining passive-source seismic survey data for the subsurface region, wherein the survey's receivers were seismometers located generally over said subsurface region and spaced for hydrocarbon prospecting, said seismometers being suitable for global seismology earthquake detection, and wherein said passive-source seismic data were collected over a time period determined to include at least one event identified in a published catalog of global earthquake locations and estimated to have a dominant frequency at the subsurface region in a range of 0 to 8 Hz based on said at least one event's magnitude and distance from the subsurface region;
 (b) obtaining at least one other type of geophysical data for the subsurface region, selected from a group consisting of active-source seismic, controlled source electromagnetic, magnetotelluric, magnetic, and gravity;
 (c) deriving a physical properties model giving values of at least one physical property at different locations in the subsurface region by simultaneously using said passive-source seismic data and the at least one other type of geophysical data; and
 (d) using the physical properties model to predict hydrocarbon potential for the subsurface region.

2. The method of claim 1, wherein the seismometers have frequency bandwidth covering at least 1-6 Hz.

3. The method of claim 1, wherein the passive-source seismic survey data include data from at least one regional earthquake or data from at least one local earthquake, wherein regional means an earthquake with its hypocenter within the range of 10 degrees to 30 degrees from the subsurface region of interest, and local means an earthquake with its hypocenter within the range of 1 degree to 10 degrees from the subsurface region of interest.

4. The method of claim 1, wherein the passive-source seismic survey data include data from at least one teleseismic earthquake, wherein teleseismic means an earthquake with its hypocenter greater than 30 degrees distance from the subsurface region of interest.

5. The method of claim 1, wherein "spaced for hydrocarbon prospecting" means a receiver spacing of less than about one kilometer.

6. The method of claim 1, further comprising:
 identifying one or more time segments in the passive-source seismic data, called "windowed events," and associating each with an earthquake listed in an earthquake catalog or other source of earthquake information, and taking source location information for such earthquakes from the catalog or other information source; and including the one or more windowed events and associated source locations in the at least part of the passive-source seismic data in step (c).

7. The method of claim 1, wherein a physical properties model is a model of at least one subsurface physical property selected from a group consisting of porosity, lithology, pore fluid type, hydrocarbon volume fraction, P-wave velocity, S-wave velocity, density, and acoustic impedance; wherein lithology includes at least one parameter selected from a group consisting of a shale volume fraction $V_{sH}$, a salt volume fraction $V_{SALT}$, a basalt volume fraction $V_{basalt}$, a limestone volume fraction $V_{limestone}$ and a dolomite volume fraction $V_{dolomite}$.

8. The method of claim 1, wherein simultaneously using the passive-source seismic survey data and the at least one other type of geophysical data to derive a physical properties model comprises simultaneously forward modeling the passive-source seismic survey data jointly with the at least one other type of geophysical data, then manually updating the model, then iterating to optimize the physical properties model of the subsurface region.

9. The method of claim 1, wherein simultaneously using at least part of the passive-source seismic survey data and the at least one other type of geophysical data to derive a physical properties model comprises automated inverting of the at least part of the passive-source seismic survey data jointly with the at least one other type of geophysical data to obtain the physical properties model of the subsurface region.

10. The method of claim 9, wherein the automated joint inversion is performed using non-linear, multi-objective, constrained or unconstrained gradient techniques, or hybrid techniques involving gradient or derivative free methods.

11. The method of claim 10, wherein the joint inversion is or can be expressed as a constrained or unconstrained multi-objective problem, where the vector or multi-objective error functional to be minimized can be expressed as ($\psi^{total}$):

$$\psi^{total}=[\psi_1(m)\psi_2, \ldots \psi_n(m)]^T$$

where each term in the functional above is or can be expressed using matrix formulation as:

$$\psi = \frac{1}{2}\{D(d^{obs} - d^{pred})\}^T\{D(d^{obs} - d^{pred})\} + \frac{1}{2}\lambda\{Wm\}^T\{Wm\}$$

where m is a model vector, $d^{obs}$ are the measured data being inverted, $d^{pred}$ are corresponding data values predicted using the model, D is a weighting matrix that weights the measured data, W is a roughening or damping matrix that reduces model curvature or size of perturbations in three dimensions, and $\lambda$ is a scaling parameter that balances the model's smoothness or roughness against the data error, said data error being the difference between $d^{obs}$ and $d^{pred}$.

12. The method of claim 9, wherein the at least one other type of geophysical data is selected from a group consisting of controlled source electromagnetic, magnetotelluric, magnetic, and gravity, and wherein underlying rock physics relationships are used to relate density properties to either electrical properties or elastic properties or both, thereby enabling the inversion to be performed jointly.

13. The method of claim 12, wherein the underlying rock physics relationships are empirical or model-based equations relating rock properties to one another.

14. The method of claim 11, wherein parameters of the rock physics model, i.e. components of vector m, are represented on a finer scale computational grid than is used for forward modeling to obtain predicted data values, and the data errors are downscaled from the forward modeling grid back to the rock property micro-grid.

15. The method of claim 11, wherein said data error contains a misfit that has been computed from the passive-source seismic survey data for at least one survey seismometer as the subtraction difference between an observed receiver function and a predicted receiver function.

16. The method of claim 15, wherein computing receiver functions and using the receiver functions to determine the data error misfit from one or more subsurface reflectors comprises:
   (i) rotating multi-component seismic data from a vertical and horizontal coordinate system in which the data were recorded into a radial and transverse domain, wherein the radial component points toward the passive seismic data's source and the transverse component is perpendicular to it;
   (ii) deconvolving the radial component from the vertical component of motion;
   (iii) using the deconvolved components and identifying one or more reflectors in the subsurface region at which P-wave energy has converted to S-wave energy and its multiples or the reverse;
   (iv) determining differential arrival times from the identified reflectors; and
   (v) computing the difference between the predicted receiver function and the observed function.

17. The method of claim 9, wherein (d) comprises obtaining subsurface seismic wave propagation velocities from the joint inversion of the passive-source seismic survey data and the at least one other type of geophysical data, and using the velocities for depth migration of active source seismic reflection data obtained from the subsurface region.

18. The method of claim 11, wherein said data error includes a misfit computed from the passive-source seismic survey data by measuring travel time delays and computing the mathematical subtraction difference between measured travel time delay and a predicted travel time delay for a selected earthquake's arrival phase at a selected seismometer.

19. The method of claim 11, wherein said data error includes a misfit computed from the passive-source seismic survey data by measuring dispersion between at least two survey seismometers and computing the mathematical difference between the measured dispersion and a predicted dispersion.

20. The method of claim 11, wherein said data error includes a misfit computed from the passive-source seismic survey data for at least one survey seismometer by computing the mathematical subtraction difference between an observed interferometric calculation and a predicted interferometric calculation.

21. The method of claim 11, wherein said data error includes a misfit computed from the passive-source seismic survey data for at least one survey seismometer by computing the mathematical subtraction difference between a partial or full waveform recorded at the at least one survey seismometer, and a predicted, synthetic partial or full waveform.

22. A method for hydrocarbon detection in a subsurface region using passive-source seismic data, comprising:
   (a) obtaining passive-source seismic survey data for the subsurface region, wherein the survey's receivers were seismometers located generally over said subsurface region and spaced for hydrocarbon prospecting, said seismometers being suitable for global seismology earthquake detection;

(b) determining one or more earthquakes from a published catalog of global earthquake locations, which one or more earthquakes can be identified in the seismometer data, and taking source location information for said earthquakes from the published earthquake catalog, and wherein said one or more earthquakes include at least one event identified in the published earthquake catalog to be of a magnitude and distance away sufficient to contain a dominant frequency in a range of 0 to 8 Hz;

(c) retrieving time segments from the seismometer data corresponding to records of each of said identified earthquakes;

(d) inverting the segments of seismometer data and earthquake source location information to infer a physical properties model giving values of at least one physical property at different locations in the subsurface region; and (e) using the physical properties model to predict hydrocarbon potential for the subsurface region.

23. A method for producing hydrocarbons from a subsurface region, comprising:

(a) obtaining passive-source seismic survey data for the subsurface region, wherein the survey's receivers were seismometers located generally over said subsurface region and spaced for hydrocarbon prospecting, said seismometers being suitable for global seismology earthquake detection;

(b) determining one or more earthquakes from a published catalog of global earthquake locations, which earthquakes can be identified in the seismometer data, and taking source location information for said earthquakes from the published earthquake catalog, and wherein said one or more earthquakes include at least one event identified in the published earthquake catalog to be of a magnitude and distance away sufficient to contain a dominant frequency in a range of 0 to 8 Hz;

(c) retrieving time segments from the seismometer data corresponding to records of each of said identified earthquakes;

(d) obtaining at least one other type of geophysical data for the subsurface region, selected from a group consisting of active source seismic, controlled source electromagnetic, magnetotelluric, magnetic, and gravity;

(e) deriving a physical properties model giving values of at least one physical property at different locations in the subsurface region by simultaneously using the segments of seismometer data and earthquake source location information and the at least one other type of geophysical data;

(f) using the physical properties model to predict hydrocarbon potential for the subsurface region; and (g) in response to a positive prediction, drilling a well into the subsurface region and producing hydrocarbons.

24. A method for hydrocarbon detection in a subsurface region using earthquake-source seismic data in conjunction with active-source seismic data, comprising:

(a) obtaining earthquake-source seismic survey data for the subsurface region, wherein the surveys receivers were seismometers located generally over said subsurface region and spaced for hydrocarbon prospecting, said seismometers being suitable for global seismology earthquake detection, and wherein said earthquake-source seismic data were collected over a time period determined to include at least one event identified in a published catalog of global earthquake locations to be of a magnitude and distance away sufficient to contain a dominant frequency in a range of 0 to 8 Hz;

(b) obtaining active-source seismic survey data for the subsurface region;

(c) jointly inverting the earthquake-source seismic survey data with the active-source seismic survey data to derive a velocity model of the subsurface region; and (d) using the velocity model to predict hydrocarbon potential for the subsurface region.

* * * * *